United States Patent
Lee et al.

(10) Patent No.: US 7,391,494 B2
(45) Date of Patent: Jun. 24, 2008

(54) METHOD OF FABRICATING LCD

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 185 days.

(21) Appl. No.: 10/914,463

(22) Filed: Aug. 10, 2004

(65) Prior Publication Data

US 2005/0007542 A1 Jan. 13, 2005

Related U.S. Application Data

(63) Continuation of application No. 10/322,674, filed on Dec. 19, 2002, now Pat. No. 6,784,970.

(30) Foreign Application Priority Data

Feb. 27, 2002 (KR) ............... 10-2002-10557
Mar. 4, 2002 (KR) ............... 10-2002-11372

(51) Int. Cl.
*G02F 1/1339* (2006.01)
(52) U.S. Cl. ............................................. 349/190
(58) Field of Classification Search ............... 349/190
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |

(Continued)

FOREIGN PATENT DOCUMENTS

EP 1003066 A1 5/2000

(Continued)

*Primary Examiner*—James A. Dudek
(74) *Attorney, Agent, or Firm*—McKenna Long & Aldridge LLP

(57) ABSTRACT

Method for fabricating an LCD having the liquid crystal dropping method applied thereto, including providing a first substrate and a second substrate having seals formed thereon, loading the first and second substrates into a bonding chamber, bonding the first and second substrates, setting the bonded first and second substrates, venting the bonding chamber for applying a pressure to the first and second substrates, and unloading the first and second substrates having the pressure applied thereto.

43 Claims, 16 Drawing Sheets

U.S. PATENT DOCUMENTS

| | | | |
|---|---|---|---|
| 5,861,932 A | 1/1999 | Inata et al. | |
| 5,875,922 A | 3/1999 | Chastine et al. | |
| 5,952,676 A | 9/1999 | Sato et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,128,066 A * | 10/2000 | Yokozeki | 349/187 |
| 6,163,357 A | 12/2000 | Nakamura | |
| 6,219,126 B1 | 4/2001 | Von Gutfeld | |
| 6,222,603 B1 * | 4/2001 | Sakai et al. | 349/153 |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 * | 10/2001 | Egami et al. | 349/189 |
| 6,337,730 B1 | 1/2002 | Ozaki et al. | |
| 6,414,733 B1 | 7/2002 | Ishikawa et al. | |
| 6,829,032 B2 * | 12/2004 | Lee et al. | 349/187 |
| 2002/0008838 A1 | 1/2002 | Matsuda | |
| 2002/0044253 A1 * | 4/2002 | Masuda et al. | 349/190 |
| 2004/0233380 A1 * | 11/2004 | Choo et al. | 349/190 |

FOREIGN PATENT DOCUMENTS

| | | |
|---|---|---|
| JP | 51-065656 | 6/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | S62-054225 | 3/1987 |
| JP | S62-054228 | 3/1987 |
| JP | S62-054229 | 3/1987 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | H06-018829 | 1/1994 |
| JP | 06051256 | 2/1994 |
| JP | H06-064229 | 3/1994 |
| JP | 06148657 | 5/1994 |
| JP | 6160871 | 6/1994 |
| JP | H06-194637 | 7/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | H07-275770 | 10/1995 |
| JP | H07-275771 | 10/1995 |
| JP | H08-076133 | 3/1996 |
| JP | 08-101395 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08171094 | 7/1996 |
| JP | 08190099 | 7/1996 |
| JP | H08-173874 | 7/1996 |
| JP | 08240807 | 9/1996 |
| JP | 09005762 | 1/1997 |
| JP | 09026578 | 1/1997 |
| JP | H09-001026 | 1/1997 |
| JP | 09-061829 | 3/1997 |
| JP | 09073075 | 3/1997 |
| JP | 09073096 | 3/1997 |
| JP | H09-094500 | 4/1997 |
| JP | 09127528 | 5/1997 |
| JP | 09-223727 | 8/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117109 | 4/2001 |
| JP | 2001117105 | 4/2001 |
| JP | 2001-133745 | 5/2001 |
| JP | 2001-133799 | 5/2001 |
| JP | 2001133794 | 5/2001 |
| JP | 2001142074 | 5/2001 |

| | | | | | |
|---|---|---|---|---|---|
| JP | 2001147437 | 5/2001 | JP | 2002-131762 | 5/2002 |
| JP | 2001-166272 | 6/2001 | JP | 2002-139734 | 5/2002 |
| JP | 2001-166310 | 6/2001 | JP | 2002-156518 | 5/2002 |
| JP | 2001-174829 | 6/2001 | JP | 20002-139734 | 5/2002 |
| JP | 2001154211 | 6/2001 | JP | 2002-169166 | 6/2002 |
| JP | 2001-183683 | 7/2001 | JP | 2002-169167 | 6/2002 |
| JP | 2001-209052 | 8/2001 | JP | 2002-182222 | 6/2002 |
| JP | 2001-209056 | 8/2001 | JP | 2002080321 | 6/2002 |
| JP | 2001-209057 | 8/2001 | JP | 2002202512 | 7/2002 |
| JP | 2001-209058 | 8/2001 | JP | 2002202514 | 7/2002 |
| JP | 2001-209060 | 8/2001 | JP | 2002214626 | 7/2002 |
| JP | 2001-222017 | 8/2001 | JP | 2002-229042 | 8/2002 |
| JP | 2001-235758 | 8/2001 | JP | 2002-236276 | 8/2002 |
| JP | 2001-215459 | 9/2001 | JP | 2002-258299 | 8/2002 |
| JP | 2001255542 | 9/2001 | JP | 2002-236292 | 9/2002 |
| JP | 2001264782 | 9/2001 | JP | 2002-277865 | 9/2002 |
| JP | 2001-201750 | 10/2001 | JP | 2002-277866 | 9/2002 |
| JP | 2001-272640 | 10/2001 | JP | 2002-277881 | 9/2002 |
| JP | 2001-281675 | 10/2001 | JP | 2002-287156 | 10/2002 |
| JP | 2001-281678 | 10/2001 | JP | 2002-296605 | 10/2002 |
| JP | 2001-282126 | 10/2001 | JP | 2002-311438 | 10/2002 |
| JP | 2001-305563 | 10/2001 | JP | 2002-311440 | 10/2002 |
| JP | 2001-330837 | 11/2001 | JP | 2002-311442 | 10/2002 |
| JP | 2001330840 | 11/2001 | JP | 2002-323687 | 11/2002 |
| JP | 2001-337335 | 12/2001 | JP | 2002-323694 | 11/2002 |
| JP | 2001-356353 | 12/2001 | JP | 2002-333628 | 11/2002 |
| JP | 2001356354 | 12/2001 | JP | 2002-333635 | 11/2002 |
| JP | 2002014360 | 1/2002 | JP | 2002-333843 | 11/2002 |
| JP | 2002023176 | 1/2002 | JP | 2002-341329 | 11/2002 |
| JP | 2002049045 | 2/2002 | JP | 2002-341355 | 11/2002 |
| JP | 2002-079160 | 3/2002 | JP | 2002-341356 | 11/2002 |
| JP | 2002082340 | 3/2002 | JP | 2002-341357 | 11/2002 |
| JP | 2002090759 | 3/2002 | JP | 2002-341358 | 11/2002 |
| JP | 2002090760 | 3/2002 | JP | 2002-341359 | 11/2002 |
| JP | 2002-122870 | 4/2002 | JP | 2002-341362 | 11/2002 |
| JP | 2002107740 | 4/2002 | KR | 2000-0035302 A1 | 6/2000 |
| JP | 2002122872 | 4/2002 | KR | 1020020015004 A | 2/2002 |
| JP | 2002122873 | 4/2002 | * cited by examiner | | |

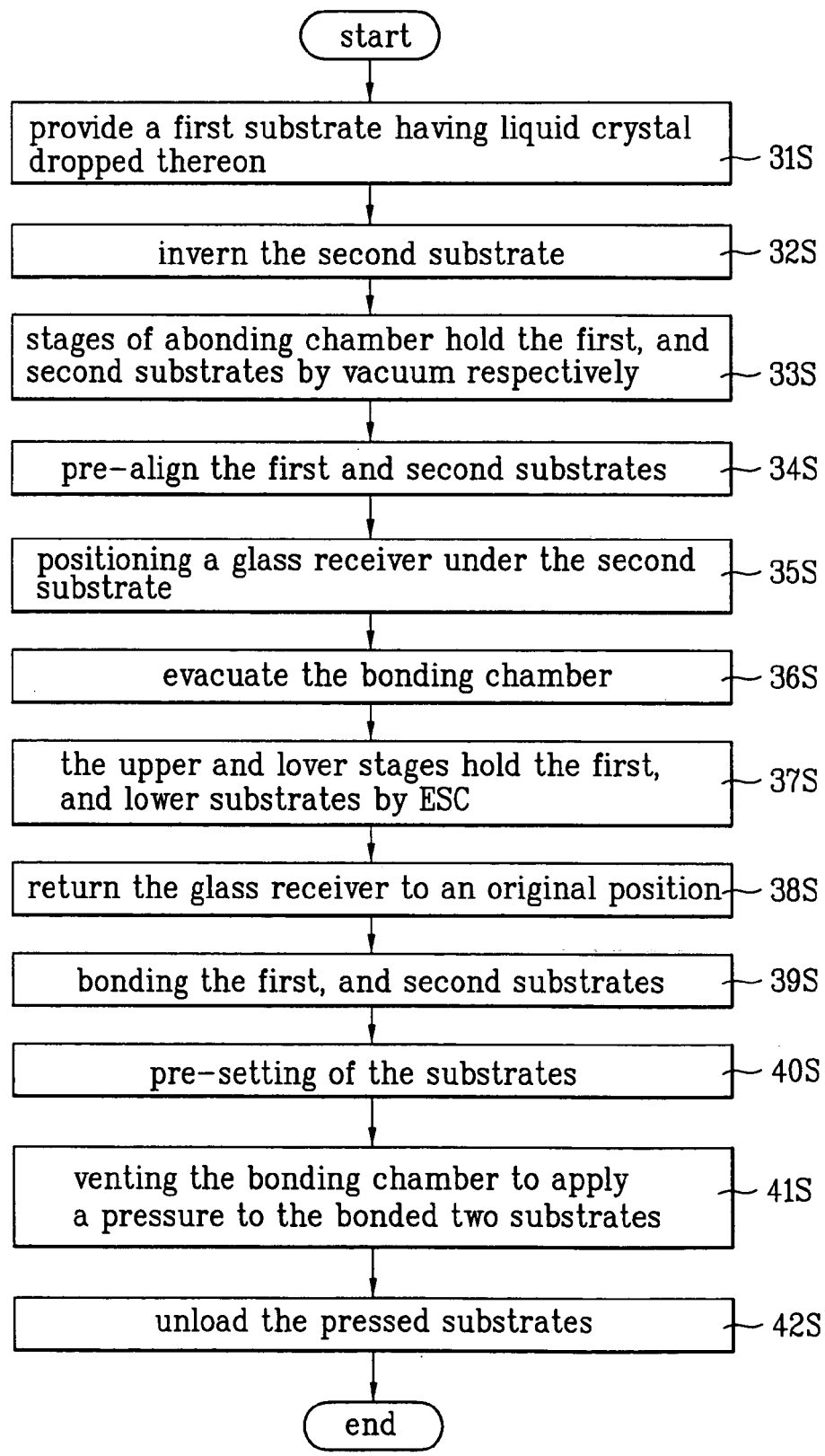

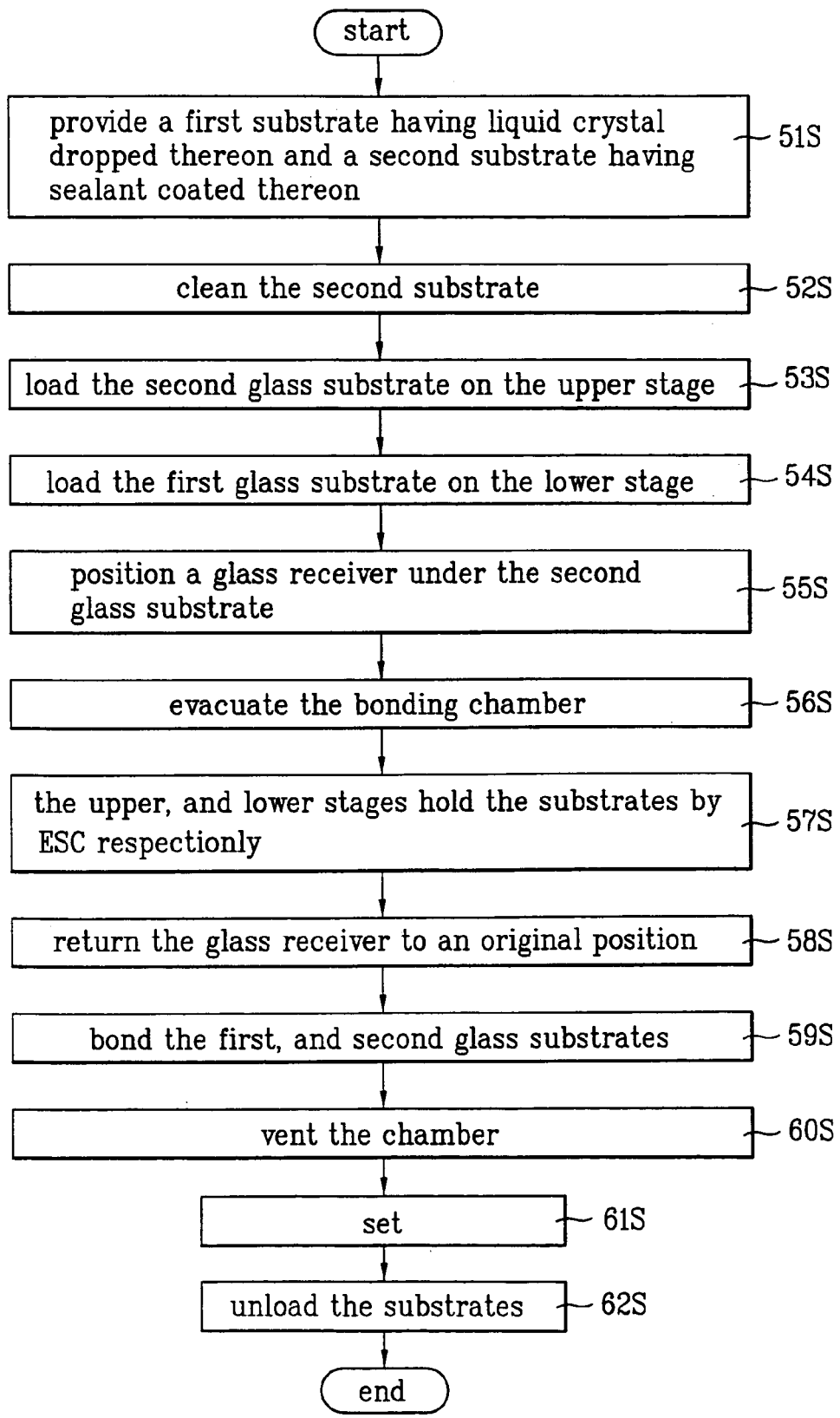

US 7,391,494 B2

METHOD OF FABRICATING LCD

This application is a continuation application of U.S. patent application Ser. No.: 10/322,674, filed Dec. 19, 2002 now U.S. Pat. No. 6,784,970, now allowed, which claims priority to Korean Patent Application Nos. P2002-10557, filed on Feb. 27, 2002, and P2002-11372, filed on Mar. 4, 2002, each of which are hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD), and more particularly, to a method for fabricating an LCD having a liquid crystal dropping method applied thereto.

2. Background of the Related Art

Keeping pace with development of an information oriented society, demands on displays increase gradually in a variety of forms, and, recently to meet the demands, different flat display panels, such as LCD (Liquid Crystal Display), PDP (Plasma Display Panel), ELD (Electro Luminescent Display), VFD (Vacuum Fluorescent Display), and the like, have been under development, and some of which are employed as displays in various apparatuses.

The LCDs have been used most widely as mobile displays while the LCDs replaces the CRT (Cathode Ray Tube) owing to features and advantages of excellent picture quality, lightweight, thin, and low power consumption. Besides the mobile type LCDs, such as a monitor of a notebook computer, the LCDs are under development for televisions (TVs) for receiving and displaying broadcasting signals, and computer monitors.

Despite the various technical developments in the LCD for serving as a display in different fields, the studies for enhancing a picture quality of the LCD as a display are inconsistent as to the features and advantages of the LCD in many aspects. Therefore, for employing the LCD in various fields as a general display, the key for development of the LCD lies on whether the LCD can implement a high quality picture, such as a high definition, a high luminance, and a large sized screen while the LCD has a light weight, thin, and a low power consumption.

The LCD is provided with a liquid crystal display panel for displaying a picture, and a driving part for providing a driving signal to the liquid crystal display panel, wherein the liquid crystal display panel has first and second glass substrates bonded together with a gap between the substrates, and a liquid crystal layer injected between the first and second glass substrates.

On the first glass substrate (a TFT array substrate), there are a plurality of gate lines arranged in one direction at fixed intervals, a plurality of data lines arranged in a direction perpendicular to the gate lines at fixed intervals, a plurality of pixel electrodes in respective pixel regions defined at crossing points of the gate lines and the data lines to form a matrix, a plurality of thin film transistors switchable in response to a signal from the gate lines for transmission of a signal from the data line to the pixel electrodes.

The second glass substrate (a color filter substrate) has a black matrix layer for shielding light from parts excluding the pixel regions, a red, green, blue (R, G, B) color filter layer for displaying colors, and a common electrode for implementing a picture.

The foregoing first and second substrates are bonded together, spaced by spacers, with sealant having a liquid crystal injection opening therein, through which liquid crystal is injected.

The liquid crystal is injected by evacuating the space between the two bonded substrates and dipping the liquid crystal injection opening in liquid crystal. The liquid crystal flows in the space between the two substrates by the capillary tube phenomenon. Once the liquid crystal is injected, the liquid crystal injection opening is sealed by the seal.

However, the related art method for fabricating an LCD having the liquid crystal injection method applied thereto has the following problems.

First, the related art method has poor productivity because the dipping of the liquid crystal injection opening in a liquid crystal while the space between the two substrates are maintained at a vacuum for injection of the liquid crystal, takes a long time.

Second, the liquid crystal injection, particularly, into a large sized LCD, is liable to cause imperfect filling of the liquid crystal in the panel, which is a cause of a defective panel.

Third, the complicated and lengthy time of the fabrication process results in requiring many liquid crystal injection devices, that occupy a lot of space.

Accordingly, a method for fabricating an LCD by using a liquid crystal dropping method has been researched. A Japanese laid-open patent publication No. 2000-147528 discloses the following liquid crystal dropping method.

A related art method for fabricating an LCD having the foregoing liquid crystal dropping method applied thereto will be explained. FIGS. 1A-1F illustrate the steps of a related art method for fabricating an LCD.

Referring to FIG. 1A, ultraviolet (UV) sealant 1 is coated on a first glass substrate 3 having a thin film transistor array formed thereon to a thickness of approx. 30 μm, and liquid crystal 2 is dropped on an inner side of the seals 1 (a thin film transistor array part). No liquid crystal injection opening is provided in the seal 3.

The first glass substrate 3 is mounted on a table 4 in a vacuum container 'C' which is movable in a horizontal direction, and held by a first suction device 5 holding an entire bottom surface of the first glass substrate 3 by vacuum.

Referring to FIG. 1B, an entire bottom surface of the second glass substrate 6 having the color filter array formed thereon is held by a second suction device 7 by vacuum, and the vacuum container 'C' is closed and evacuated. The second suction device 7 is moved downward in a vertical direction until a gap between the first and second glass substrates 3 and 6 becomes 1 mm, and the table 4 with the first glass substrate 3 thereon is moved in a horizontal direction, to pre-align the first and second glass substrates 3 and 6.

Referring to FIG. 1C, the second suction device 7 is moved downward until the second glass substrate 6 comes into contact with the liquid crystal 2 or the seal 1.

Referring to FIG. 1D, the table 4 with the first glass substrate 3 thereon is moved in a horizontal direction to align the first and second glass substrates 3 and 6.

Referring to FIG. 1E, the second suction device 7 is moved downward until the second glass substrate 6 comes into contact with the seals 1, and is pressed downward until a gap between the second glass substrate 6 and the first glass substrate 3 becomes 5 μm.

Referring to FIG. 1F, the bonded first and second glass substrates 3 and 6 are taken out of the vacuum container 'C', a UV beam is directed towards the seal 1, to set the seal 1, thereby finishing fabrication of the LCD. In the seal 1, there are main seals and dummy seals surrounding an active region of the LCD.

However, the foregoing related art method for fabricating an LCD having the liquid crystal dropping method applied thereto has the following problems.

First, the sealant coating and liquid crystal dropping on the same substrate requires a long fabrication time period before the two substrates are bonded.

Second, as the sealant is coated and the liquid crystal is dropped on the first substrate while no progress is made for the second substrate, there is an unbalance of a fabrication process between the first and second substrates, which implies an ineffective operation of the production line.

Third, because the sealant is coated and the liquid crystal is dropped on the first substrate, the first substrate with a coat of the sealant applied thereto cannot be cleaned by an ultra sonic cleaner (USC). Therefore, as the sealant that is to bond the two substrates should not be washed away, particles cannot be removed, which may cause defective contact of the sealant during bonding.

Fourth, the movement of bonded substrates yet to be set for venting, or for unloading after the venting, is liable to cause misalignment as a size of the substrate increases.

Fifth, it is difficult to maintain a bonded state in subsequent steps until the sealant is set as the size of the substrate increases.

Sixth, the movement of the liquid crystal between the substrates caused by the misalignment of the substrates causes defective orientation of the liquid crystal.

Seventh, the misalignment of the substrates deteriorates the aperture ratio.

Eighth, the defective orientation of the liquid crystal is liable to cause blots like scratches, and blots related to a luminance.

Ninth, the bonding of the two substrates only by a physical force of the table and the second suction device may cause defective bonding due to non-uniform application of pressure throughout the substrate in a case where levels of the table and the second suction device are not correct.

Tenth, the introduction of air into the vacuum container for restoring the vacuum container into atmospheric pressure after the bonding may deteriorate a state of the vacuum container due to moisture contained in the air.

SUMMARY OF THE INVENTION

Accordingly, the present invention is directed to a method for fabricating a liquid crystal display (LCD) that substantially obviates one or more of the problems due to limitations and disadvantages of the related art.

An advantage of the present invention is to provide a method for fabricating an LCD having the liquid crystal dropping method applied thereto, which can shorten a fabrication time period, and apply a pressure uniformly to prevent misalignment of the substrates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for fabricating a liquid crystal display (LCD) includes providing a first substrate, and a second substrate having seals formed thereon; loading the first and second substrates into a bonding chamber; bonding the first and second substrates; setting the bonded first and second substrates; venting the bonding chamber for applying a pressure to the first and second substrates; and unloading the first and second substrates having the pressure applied thereto.

Loading includes providing upper and lower stages holding the first and second substrates by vacuum in the bonding chamber respectively; pre-aligning the first and second substrates; positioning a glass receiver of a bonding machine under the second substrate held at the upper stage; and providing respective stages holding the first and second substrates by electro static charge (ESC).

Bonding includes varying the pressure at least in two stages.

Setting bonded first and second substrates includes directing a light, or applying heat to the sealant of photo or thermosetting material, for setting the bonded substrates.

The sealant includes main seals and setting seals, and setting the bonded first and second substrates includes setting the setting seals for setting the two substrates.

The sealant includes main seals for sealing the liquid crystal dropped on the plurality of panels; a dummy seal for protecting the plurality of main seals; and setting seals for setting the bonded two substrates. Setting the bonded first and second substrates includes setting the setting seals for setting the first and second substrates.

The setting seals are formed on a periphery of the substrate, or between the panels.

The sealant includes main seals for sealing the liquid crystal dropped on the plurality of panels, and a plurality of dummy seals for protecting the plurality of main seals respectively, and setting the bonded first and second substrates includes setting the dummy seals for setting the first and second substrates.

Venting the bonding chamber for applying a pressure to the first and second substrates includes finishing moving the upper stage upward from the bonding machine, and injecting gas or dry air into the bonding chamber.

Venting the bonding chamber for applying a pressure to the first and second substrates includes injecting gas or dry air into the bonding chamber after moving the upper stage upward from the bonding machine and before finishing the moving the upper stage upward.

Venting the bonding chamber for applying a pressure to the first and second substrates includes injecting gas or dry air into the bonding chamber at the simultaneously with moving the upper stage upward.

Gas or dry air is blown through vacuum suction holes in the upper stage while the upper stage of the bonding chamber is moved upward.

Venting the bonding chamber for applying a pressure to the first and second substrates includes starting injection of gas or dry air into the bonding chamber, and moving the upper stage upward from the bonding machine.

Moving the upper stage upward from the bonding machine is carried out while gas or dry air is blown through vacuum suction holes in the upper stage of the bonding machine.

Venting the bonding chamber for applying a pressure to the first and second substrates includes injecting the gas or the dry air into the bonding chamber in two stages.

Venting the bonding chamber includes applying a pressure until a gap between the two bonded substrates is below 5 μm.

Liquid crystal is dropped on the first substrate.

Unloading includes loading at least one of the first and second substrates to be bonded next on the upper or the lower stages, and unloading the set substrates.

In another aspect of the present invention, there is provided a method for fabricating an LCD including loading first and second substrates having liquid crystal dropped thereon and seals formed thereon into a bonding chamber; bonding the first and second substrates; venting the bonding chamber for applying a pressure to the first and second substrates; and unloading the first and second substrates.

The method for fabricating an LCD further includes aligning the first and second substrates before bonding the first and second substrates.

In further aspect of the present invention, there is provided a method for fabricating an LCD including loading a first substrate and a second substrate having sealant coated thereon into a bonding chamber; bonding the first and second substrates; venting the bonding chamber for applying a pressure to the first and second substrates; and unloading the set first and second substrates.

The sealant includes main seals and setting seals, and setting the pressed first and second substrates includes setting the setting seals for setting the first and second substrates.

A plurality of the setting seals are formed on a periphery of the substrate.

The sealant includes main seals for sealing the liquid crystal dropped on the plurality of panels, a dummy seal for protecting the plurality of main seals, and setting seals for setting the bonded two substrates. Setting the pressed first and second substrates includes setting the setting seals for setting the first and second substrates.

A plurality of the dummy seals are formed on an outer periphery of the plurality of main seals, respectively.

The sealant includes main seals for sealing the liquid crystal dropped on the plurality of panels, and a plurality of dummy seals for protecting the plurality of main seals respectively, and setting the pressed first and second substrates includes setting the dummy seals for setting the first and second substrates.

The dummy seals are set partly.

Setting the pressed first and second substrates includes coating adhesive having an excellent setting capability superior to the sealant on a cutting part or a periphery of the second substrate in forming the seals, and setting the pressed substrates by the adhesive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a flow chart showing the steps of bonding in accordance with a first example of the present invention;

FIG. 11 illustrates a flow chart showing the steps of a bonding method in accordance with a second example of the present invention.

DETAILED DESCRIPTION OF THE ILLUSTRATED EMBODIMENT

Reference will now be made in detail to embodiments of the present invention, examples of which are illustrated in the accompanying drawings.

FIRST EXAMPLE

FIGS. 2A-2H illustrate sections showing the steps of a method for fabricating an LCD having a liquid crystal dropping method applied thereto in accordance with an embodiment of the present invention schematically. FIG. 3 illustrates a flow chart showing the steps of bonding in accordance with a first example of the present invention.

The steps of bonding in accordance with a first embodiment of the present invention includes inverting a substrate having no liquid crystal dropped thereon; loading two substrates into a bonding chamber; bonding the two substrates; setting the substrates by setting seals in the same chamber; venting the bonding chamber for applying a pressure to the two substrates; and unloading the bonded two substrates from the bonding chamber.

Figure 1A:
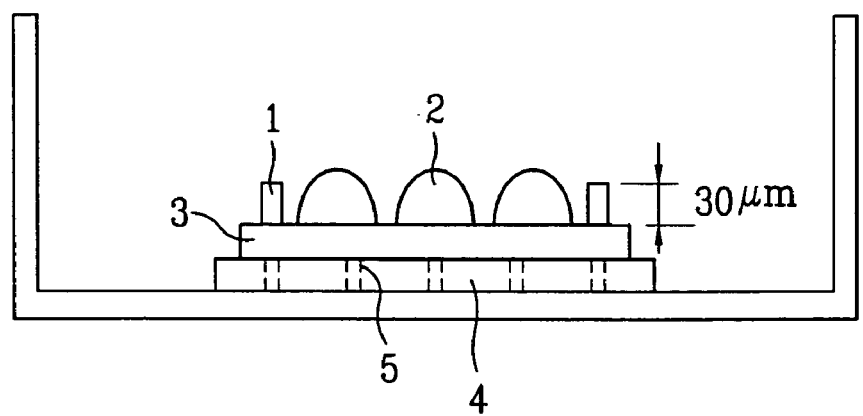
FIGS. 1A-1F illustrate sections showing the steps of a related art method for fabricating an LCD having a liquid crystal dropping method applied thereto, schematically.
Figure 1B:
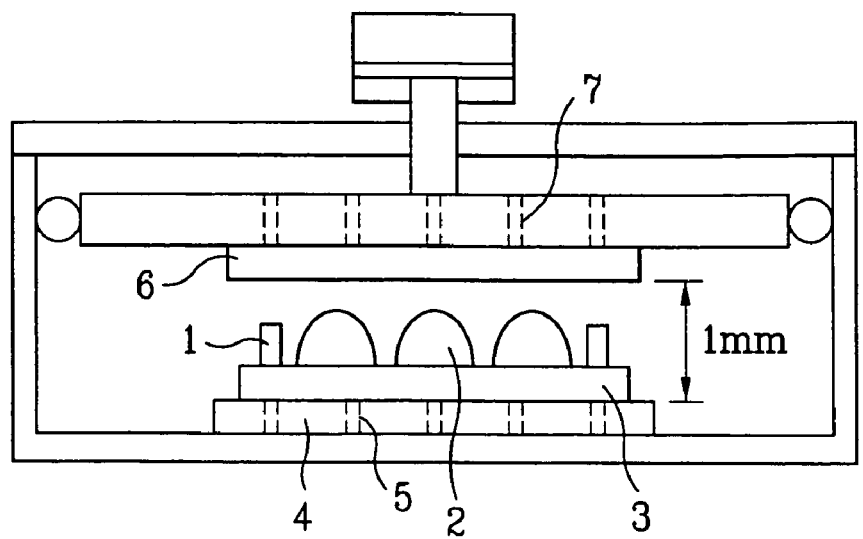
Figure 1C:
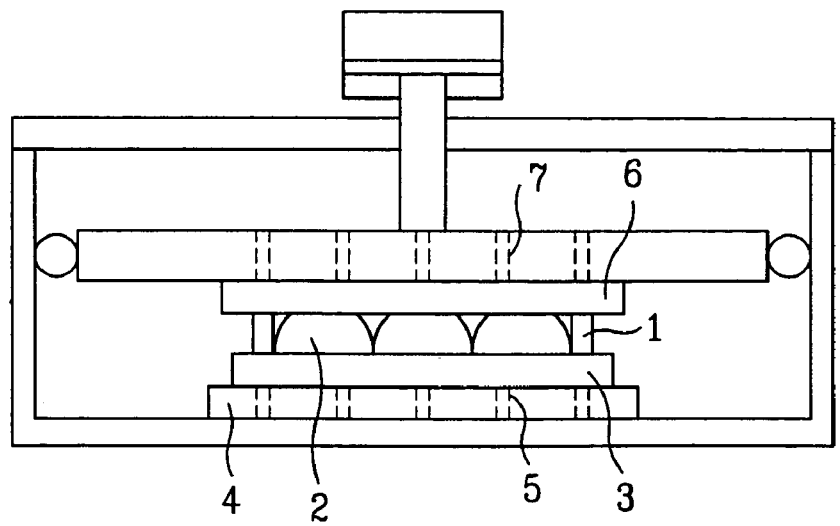
Figure 1D:
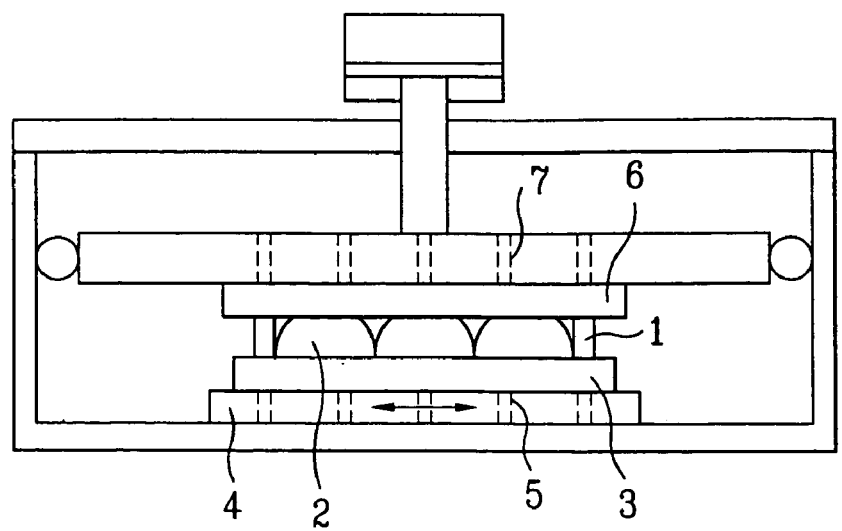
Figure 1E:
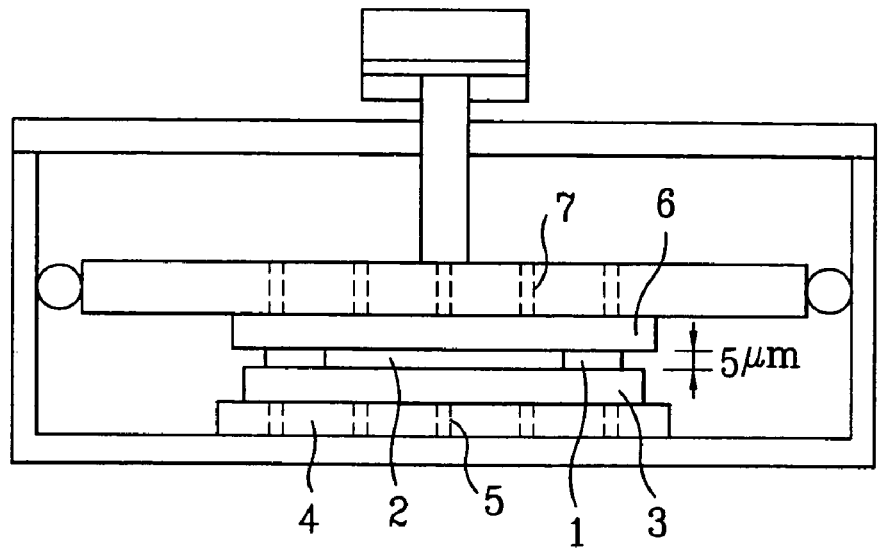
Figure 1F:
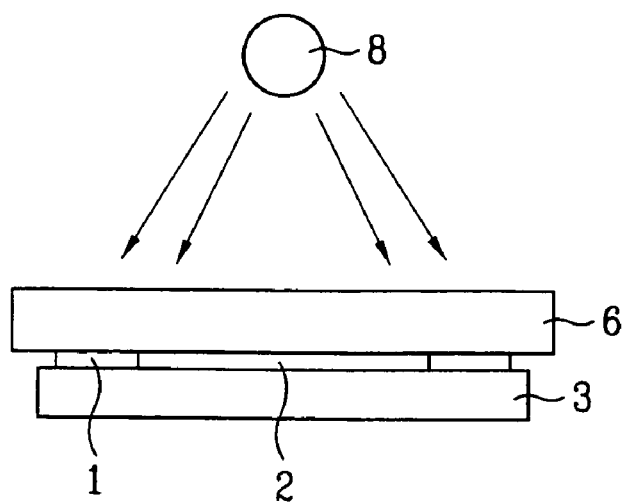
Figure 2A:
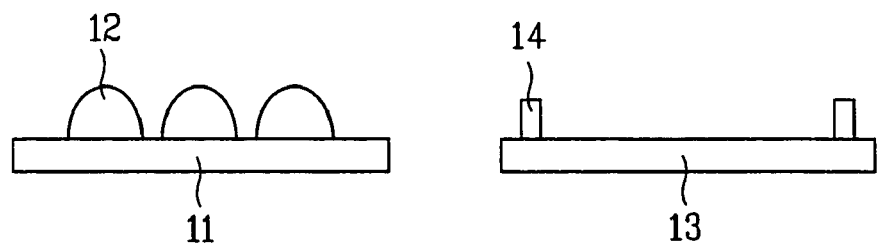
FIGS. 2A-2H illustrate sections showing the steps of a method for fabricating an LCD having a liquid crystal dropping method applied thereto in accordance with a first embodiment of the present invention, schematically.

Referring to FIG. 2A, by dropping liquid crystal 12 on a first glass substrate 11 and coating sealant 14 on a second substrate 13, the first glass substrate 11 having the liquid crystal 12 dropped thereon and the second substrate 13 having the sealant 14 coated thereon are provided (step 31S in FIG. 3). A plurality of panels are designed on one of the first and second glass substrates 11 and 13, each with a thin film transistor array formed thereon. A plurality of panels are designed on the other glass substrate in correspondence to the panels on the one glass substrate, each with a color filter array formed thereon having a black matrix layer, a color filter layer, a common electrode, and the like. For convenience of explanation, the substrate with the thin film transistor array is referred to as a first glass substrate 11 and the substrate having the color filter array is referred to as a second glass substrate 13.

The second glass substrate 13 having the sealant coated thereon is cleaned at an Ultra Sonic Cleaner (USC), to remove particles formed during fabrication. That is, the second glass substrate 13 can be cleaned as the second glass substrate 13 has no liquid crystal dropped thereon, but the sealant coated thereon.

Figure 2B:
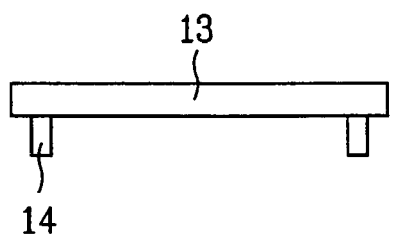

Referring to FIG. 2B, inverting one of the substrates is required since the first glass substrate 11 having the liquid crystal 12 dropped thereon and the second glass substrate having the sealant 14 coated thereon are provided with surfaces thereof having the liquid crystal dropped thereon and the sealant coated thereon faced upward respectively, for bonding together the first glass substrate 11 having the liquid crystal 12 dropped thereon and the second glass substrate having the sealant 14 coated thereon. Since the substrate having the liquid crystal dropped thereon cannot be inverted, the second glass substrate 13 having the sealant coated thereon is inverted such that the surface having the sealant coated thereon faces downward (step 32S in FIG. 3).

During inverting, though not shown, the second substrate is loaded on a table of an inverter, and the second substrate is held at the table by vacuum and clamped. The table is turned upside down, and the inverted second substrate is carried to the bonding chamber.

Figure 2C:
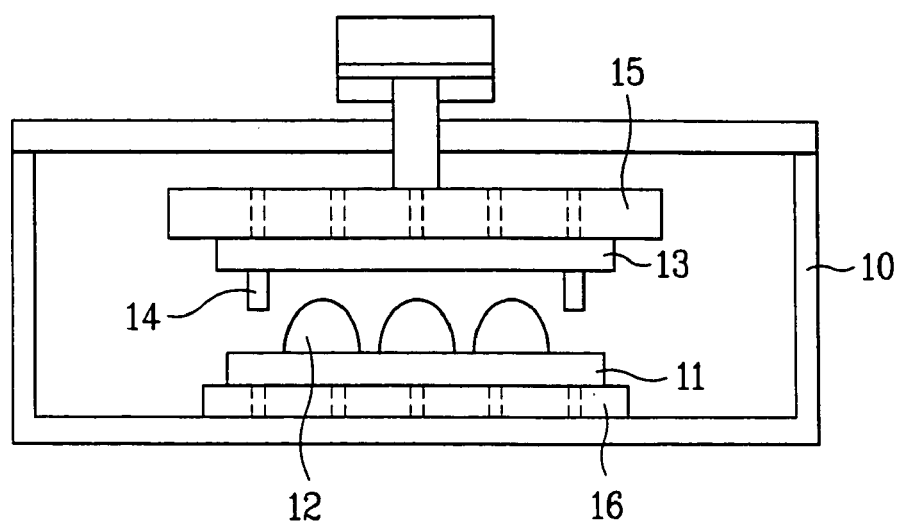

Referring to FIG. 2C, during loading, the inverted second substrate is held at the upper stage 15 in the bonding chamber 10 by vacuum suction, with the surface thereon having the sealant 14 coated thereon faced downward, the first glass substrate 11 having the liquid crystal 12 dropped thereon is held at the lower stage 16 by vacuum suction (step 34S in FIG. 3). In this instance, the vacuum bonding chamber 10 is at an atmospheric pressure.

Loading will be explained in more detail, as follows. A loader of a robot (not shown) holds and carries the second glass substrate 13 having the sealant 14 coated thereon into the vacuum bonding chamber 10 while the surface having the sealant 14 coated thereon is faced down. In this state, the upper stage 15 in the vacuum bonding chamber 10 is moved downward, and holds the second glass substrate 13 by vacuum, which is moved upward. Instead of the vacuum, an electrostatic suction may be used.

Then, the loader of the robot is removed from the vacuum bonding chamber 10, and the first glass substrate 11 having the liquid crystal 12 dropped thereon is placed on the lower stage 16 in the vacuum bonding chamber 10 by the loader of the robot.

Though it has been explained that the liquid crystal 12 is dropped on the first glass substrate 11 having the thin film transistor array formed thereon, and the sealant is coated on the second glass substrate 13, the sealant may be coated on the first glass substrate 11, and the liquid crystal may be dropped on the second substrate. Alternatively, both the liquid crystal dropping and the sealant coating may be made on either of the two glass substrates, as long as one substrate with the liquid crystal dropped thereon is placed on the lower stage, and the other substrate is held at the upper stage.

Then, the upper stage 15 holding the second glass substrate 13 by vacuum is moved downward, and the lower stage is moved in a horizontal direction, to pre-align the first glass substrate 11 and the second glass substrate 13 (step 34S in FIG. 3). In this pre-alignment, only the rough alignment marks are aligned. The pre-alignment may be omitted if necessary.

Then, after moving the upper stage 15 upward, a glass receiver (not shown) of the bonding chamber 10 is placed under the second glass substrate 13 held at the upper stage 15 (step 35S in FIG. 3). In this instance, the glass receiver is placed under the second glass substrate by the following method.

First, after moving the second glass substrate and the glass receiver closer, either by moving the upper stage down, or moving the glass receiver upward, the second glass substrate 13 is placed on the glass receiver.

Second, the upper stage is moved downward a predetermined distance, and next, the glass receiver is moved upward, to place the second glass substrate 13 and the substrate receiver closer, and the second glass substrate 13 is placed on the glass receiver.

Third, after moving the second glass substrate 13 and the substrate receiver closer, by moving the upper stage down, moving the glass receiver upward, or moving the upper stage down at first and moving the glass receiver upward, next the upper stage may hold the second glass substrate by vacuum.

In this instance, the glass receiver is placed under the second glass substrate 13, for preventing the second glass substrate held at the upper stage by vacuum from falling off the upper stage and down to the first glass substrate 11. This is due to a loss of the vacuum force of the stages coming from a vacuum in the vacuum bonding chamber increases more than the vacuum of the stages as the vacuum bonding chamber 10 is evacuated in a state where the stages 15 and 16 hold the first and second glass substrates by vacuum, respectively.

Accordingly, the second glass substrate 13 held at the upper stage by vacuum may be placed down on the glass receiver before evacuating the vacuum bonding chamber, or the upper stage holding the second glass substrate and the glass receiver may be placed at a certain distance so that the second glass substrate 13 is placed on the glass receiver from the upper stage during the evacuation of the chamber. Moreover, additionally means for holding the substrates may be provided as an air flow may occur in the chamber at an initial stage that can shake the substrates when the evacuation of the vacuum bonding chamber is started.

The vacuum bonding chamber 10 is evacuated (step 36S in FIG. 3). Though dependent on the intended liquid crystal modes to be bonded, the vacuum in the vacuum bonding chamber 10 is in a range of $1.0 \times 10^{-3}$ Pa to 1 Pa in an in plane switching (IPS) mode, and approx. $1.1 \times 10^{-3}$ Pa to $10^2$ Pa in a twisted nematic (TN) mode.

The evacuation of the vacuum bonding chamber 10 may be carried out in two stages. That is, after the substrates are respectively adsorbed to the upper and the lower stages, and a chamber door is closed, a first evacuation is started. Then, after bringing the glass receiver under the upper stage and placing the substrate down which is held at the upper stage on the glass receiver, or bringing the upper stage and the glass receiver to a certain distance in a state the upper stage holds the substrate by vacuum, the vacuum bonding chamber is evacuated for the second time. In this instance, the second evacuation is made faster than the first evacuation, and the first evacuation is provided such that the vacuum of the vacuum bonding chamber is not higher than the vacuum suction force of the upper stage.

Alternatively, without dividing the evacuation into first and second steps, after the substrates are held at respective stages and closing the chamber door, the evacuation may be started, and the glass receiver may be brought to an underside of the upper stage during the evacuation. It is required that the glass receiver brought to the underside of the upper stage occurs before the vacuum of the vacuum bonding chamber exceeds the vacuum adsorbing force of the upper stage.

Thus, the evacuation of the vacuum bonding chamber is made in two stages, for preventing deformation or shaking of the substrate in the vacuum bonding chamber caused by rapid evacuation of the vacuum bonding chamber.

Once the vacuum bonding chamber 10 is evacuated to a preset vacuum, the upper and lower stages 15 and 16 hold the first and second glass substrates 11 and 13 respectively by Electro Static Charge (ESC) (step 37S in FIG. 3), and the glass receiver is returned to an original position (step 38S in FIG. 3).

Figure 2D:
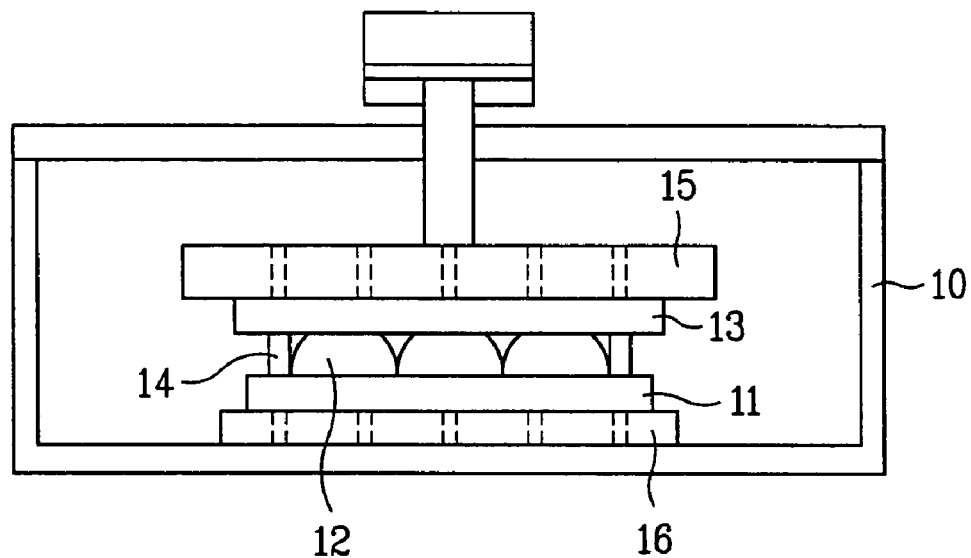
Figure 2E:
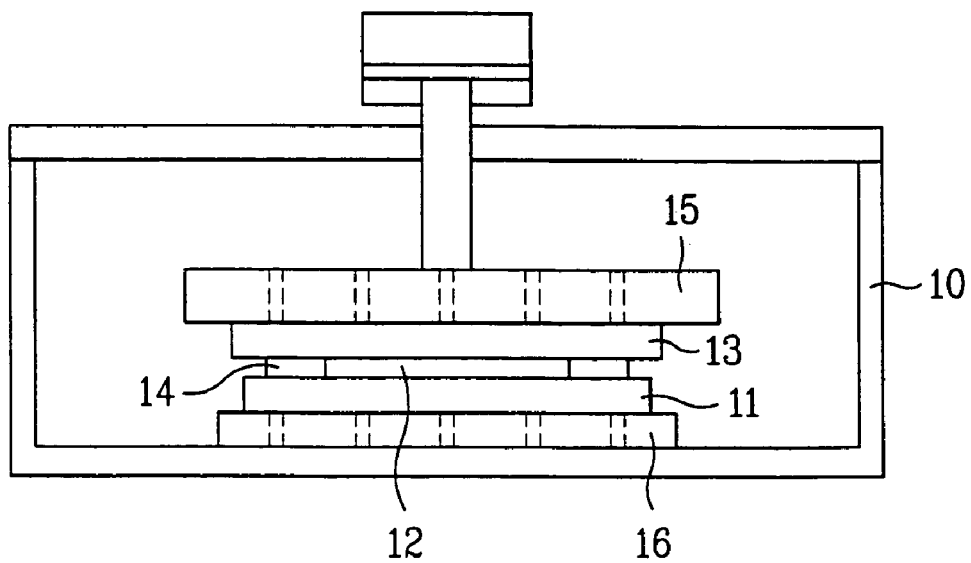

Referring to FIGS. 2D and 2E, during bonding, the upper stage 15 is moved downward in a state where the two glass substrates 11 and 13 are thus loaded at respective stages 15 and 16 by the electro static charge (ESC), to press down the first and second glass substrates 11 and 13 for bonding the two substrates 11 and 13 (first application of a pressure) (step 39S in FIG. 3). The first and second glass substrates 11 and 13 are pressed by moving either the upper stage 15 or the lower stage 16 in a vertical direction, while varying speeds and pressures of respective stages. That is, until the time the liquid crystal 12 on the first glass substrate 11 and the second glass substrate 13 come into contact, or until the time the sealant, both on the first glass substrate 11 and the second glass substrate 13 come into contact, the stages are moved at a fix speed or fixed pressure, and the pressure is boosted step by step from the time of the contact to a desired final pressure. That is, the time of contact is sensed by a load cell fitted to a shaft of the movable stage, and the two glass substrates 11 and 13 are pressed at a pressure of 0.1 ton at the time of contact, at a pressure of 0.3 ton at an intermediate stage, at a pressure of 0.4 ton at an end stage, and at a pressure of 0.5 ton at the final stage (see FIG. 2E).

In this instance, though the upper stage presses down the substrate by means of one shaft, a plurality of shafts may be provided each fitted with individual load cell, for independent application of pressure. According to this, if the lower stage and the upper stage are not leveled, and fail to press down uniformly, a pertinent shaft may be pressed at a lower or higher pressure for uniform bonding of the sealant.

Figure 2F:
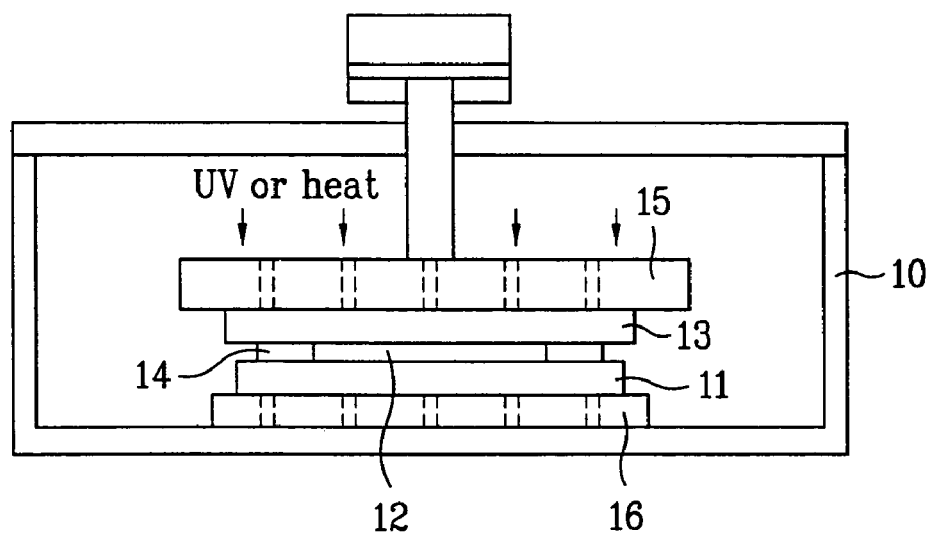

Referring to FIG. 2F, after bonding the two substrates by pressure application, by directing an ultraviolet (UV) beam, or partly applying heat or pressure, to the seals, to set the seals, the first and second glass substrates 11 and 13 are set (step 40S in FIG. 3). In this instance, the setting is carried out for preventing the bonded two substrates from being misaligned, to maintain a bonded state during carrying out a subsequent process, or movement after bonding, because misalignment of the bonded substrates may occur as the two substrates are deformed during progressing a following process, or movement after the bonding as the substrate becomes large (1000×1200 mm) and the two substrates are bonded after the liquid crystal is dropped.

Once the bonded two substrates are set, misalignment, or deformation, of the bonded first and second glass substrates can be prevented during moving the substrates for the following process. Detailed embodiments of a setting method will be later explained.

Figure 2G:
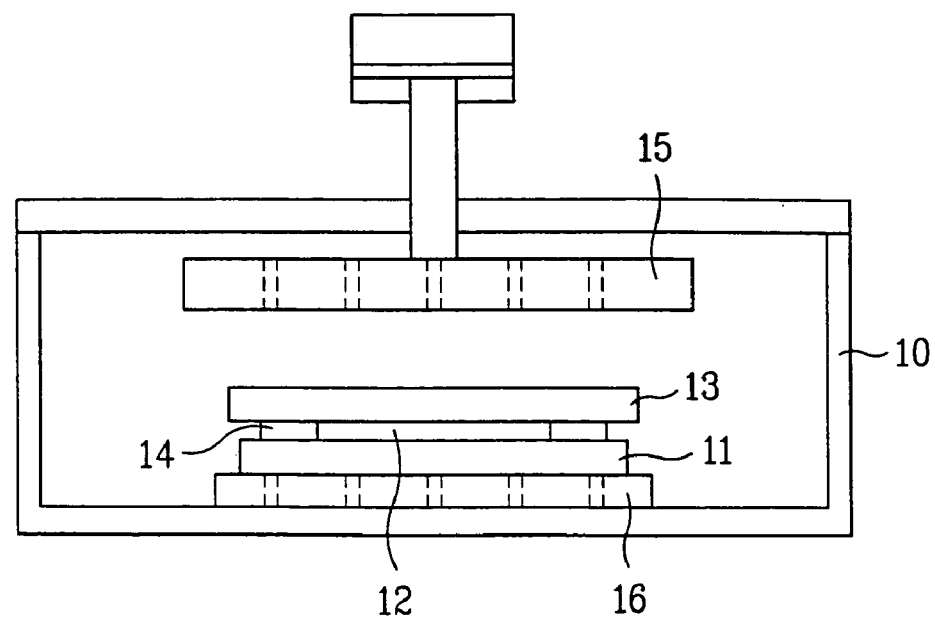

Referring to FIG. 2G, upon finishing the bonding by applying a pressure to the two substrates, after electro static charge (ESC) is off, the upper stage 15 is moved upward, to separate the upper stage 15 from the bonded two glass substrates 11 and 13.

Figure 2H:
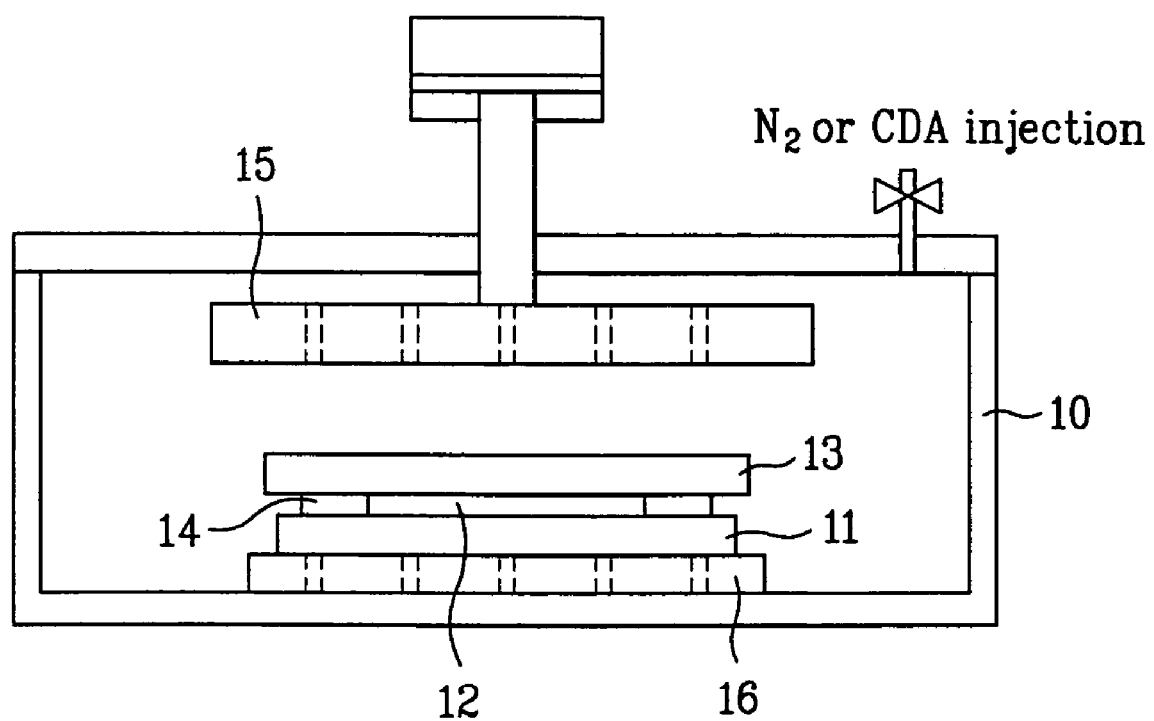

Then, referring to FIG. 2H, in order to change the bonding chamber 10 from a vacuum state to an atmospheric state, and applying a pressure to the bonded substrate uniformly, a gas, such as $N_2$, or clean dry air (CDA) is supplied to the bonding chamber 10, to vent the vacuum bonding chamber (step 41S in FIG. 3).

Thus, when the vacuum bonding chamber 10 is vented, since a gap between the first and second glass substrates bonded by the sealant 14 is in a vacuum state and the vacuum bonding chamber 10 is in an atmospheric state, the first and second glass substrates 11 and 13 are pressed uniformly by the atmospheric pressure to have a uniform gap. The bonded first and second substrates are pressed, not only by the atmospheric pressure, but also by an injection force of the $N_2$ or dry air introduced thereto in the venting.

The uniform pressure application to the two substrates is more important than anything else in the venting of the chamber. The uniform pressure application to various parts of the substrates is required for forming the sealant between the two substrate to have the same height, uniform spreading of the liquid crystal, thereby preventing cracking of the sealant, or imperfect filling of the liquid crystal. Moreover, for the uniform application of the pressure to various parts of the substrates while venting the chamber, a direction of the venting is more important than anything else.

Accordingly, the present invention provides the following embodiments.

First, a plurality of tubes may be formed above the chamber, for introducing gas into the chamber. Second, a plurality of tubes may be formed below the chamber, for introducing gas into the chamber. Third, a plurality of tubes may be formed on sides the chamber, for introducing gas into the chamber, or the above methods may be applied in parallel. Though it is preferable that the gas is introduced from above the chamber, the direction of the vent may be decided considering a size of the substrate, a state of the stage and the like.

Moreover, the two substrates 11 and 13 are pressed, not only by the atmospheric pressure, but also the injection force of the gas introduced into the chamber in the venting. Though the pressure applied to the two substrates in the venting is atmospheric ($10^5$ Pa), a pressure in a range of about 0.4~3.0 $kg/cm^2$ is appropriate, and for example, at about 1.0 $kg/cm^2$. However, the pressure can be varied with a size of the substrate, a gap between the substrates, the thickness of the sealant, and the like.

The plurality of gas injection tubes may be at least more than two, according to a size of the substrate, and herein about 8.

In order to prevent the substrates from shaking, setting means or method may be used which can prevent the substrate from shaking (movement).

Since it is likely that the substrates are shaken, and misaligned, if the chamber is vented rapidly, the gas may be vented step by step, and additionally, a slow valve for supplying the gas slowly can be provided. That is, the venting may be completed once after starting the venting, or the venting is started slowly at first, to avoid shaking of the substrate, and once the first venting reaches to a certain point, a rate of the venting may be changed, to reach to the atmospheric pressure more quickly.

Since it is likely that the bonded substrates on the stage are shaken, and misaligned by the gas, if the chamber is vented, a time of the gas injection is also important.

The venting of the chamber is started when the gap between the substrates becomes evacuated as the first pressure application is progressed after finishing the alignment. A detailed venting starting method will be explained.

First, the venting may be started after the upper stage is moved upward, and second, the venting may be started after the upper stage is starts to move, but before finishing the movement for reducing a fabrication time period. The upper stage may be moved upward while blowing the gas or the air through the upper stage.

Third, the venting may be started at the same time while moving the upper stage upward, while the gas or dry air can be blown through the upper stage, for an easy separation of the substrates from the upper stage because there may be problems that the bonded substrates are not separated from the upper stage easily, or shaken, and dropped down below the lower stage.

Fourth, the venting of the chamber may be started without moving the upper or the lower stage in a state where the bonding is performed. In this instance, the upper stage may be moved in a stage where venting of the chamber is finished, or the upper stage may be started to be moved before the venting of the chamber is finished. The upper stage may be also moved upward while the gas or dry air is blown through the upper stage, for an easy separation of the substrates from the upper stage because there may be problems that the bonded substrates are not separated from the upper stage easily, or shaken, and dropped down below the lower stage.

The bonding chamber 10 is vented thus to apply a pressure to the two substrates, down to a gap between the two substrate to be about 5 μm. That is, when the pressure is applied to the first and second substrates by the upper/lower stages 15 and 16 in the bonding chamber 10, with a height of the sealant formed to be about 35~45 μm, a gap between the substrates becomes about 25~35 μm. Then, when the venting is carried out, the gap falls below about 6 μm at a part the sealant is coated, and below about 5 μm at the panel part (cell region).

Then, the pressed substrates are unloaded (step 42S in FIG. 3). That is, when the venting is finished, after the upper stage 15 is moved upward, the first and second glass substrates 11 and 13 are unloaded by using the loader of the robot, or after the upper stage 15 holds the first and second glass substrates 11 and 13 by vacuum, and is moved upward, the loader of the robot can unload the first and second substrates from the upper stage 16.

For reducing the fabrication time period, after one of the first glass substrate 11 and the second glass substrate 13, which are to be bonded next, is loaded on the stage, the pressed first and second glass substrates may be unloaded. That is, after the second glass substrate 13 to be bonded in the next step is brought to the upper stage 15 by means of the loader of the robot, and held at the upper stage by vacuum, the pressed first and second glass substrates on the lower stage 16 may be unloaded, or after the upper stage 15 holds the bonded first and second glass substrates 11 and 13 by vacuum and is moved upward, and the loader of the robot loads the first glass substrate 11 to be bonded in the next step on the lower stage, the bonded first and second glass substrates may be unloaded.

In the above process, a liquid crystal spreading process may be added before the process for unloading the pressed substrates, for spreading the liquid crystal in the pressed substrates toward the sealant. Alternatively, the liquid crystal spreading process may be carried out additionally for spreading the liquid crystal toward the sealant evenly in a case the liquid crystal does not spread after completion of the unloading. The liquid crystal spreading process is carried out for more than about 10 minutes, under the atmospheric pressure or a vacuum.

Embodiments of the setting method will be explained. The setting is made within the bonding chamber under a vacuum or atmospheric pressure. Though the setting is carried out after the bonding, the setting may be carried out before the bonding is finished. For simplification of the process, though a material for the setting is the same as a material for main sealing, material for the setting may be different from the main sealing, for improving a setting efficiency. The setting sealant may be a photo (UV)-setting resin, a thermosetting resin, a (UV)-thermosetting resin, a pressure setting resin, or a material with a high adhesive force. The photo-setting resin includes the UV setting resin, and when the UV setting resin is used, a UV beam is directed at about 5~500 mW for about 5~40 seconds, and for example, at about 200 mW for approximately 14 seconds. If the thermosetting resin is used, though it is dependent on material of the setting sealant, heat is applied at about 50~200° C. for approximately 10 seconds. Thus, the bonded substrates can be set by light, heat, light and heat, or pressure.

Figure 4:
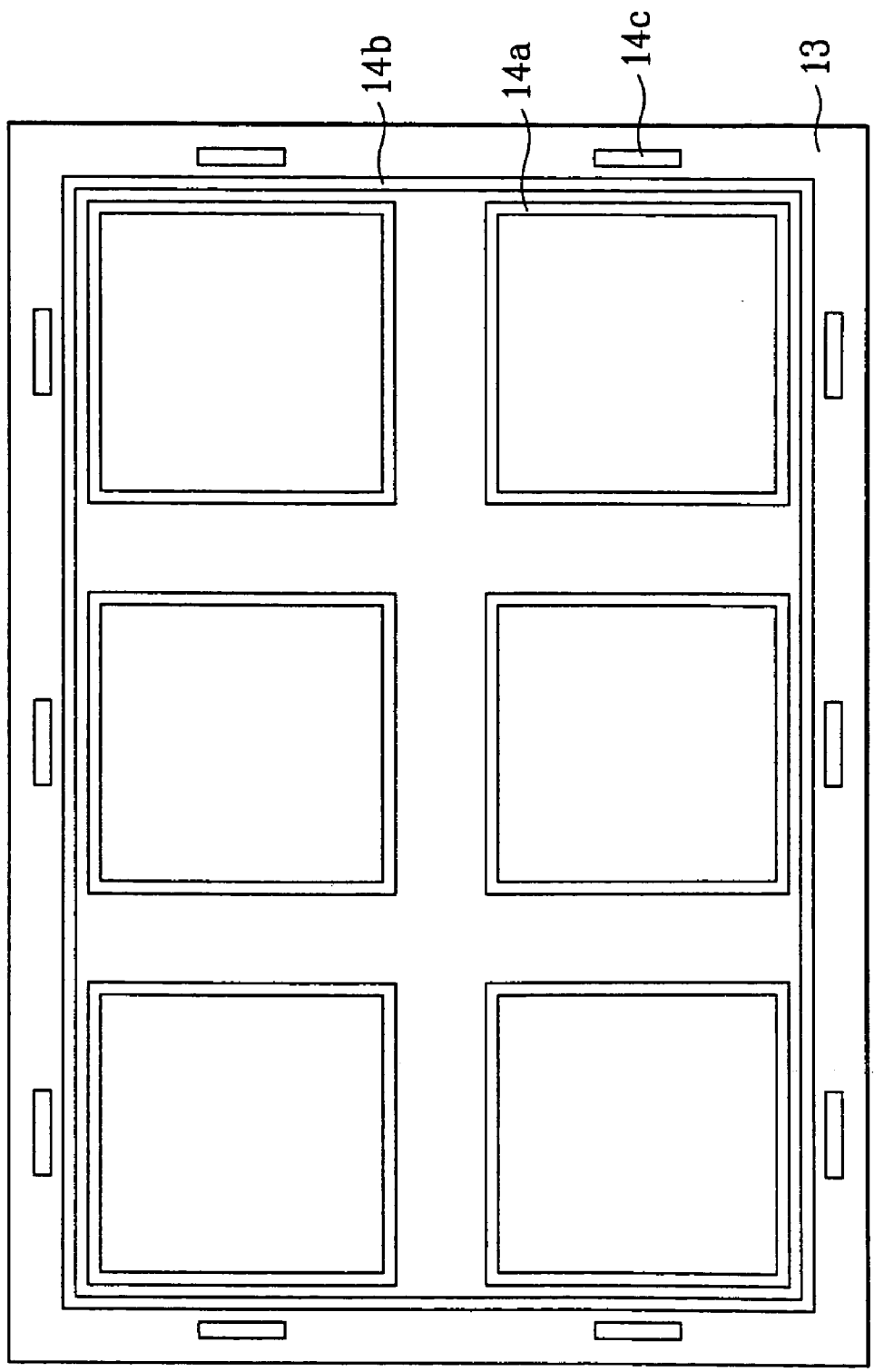
FIG. 4 illustrates a layout of seals for explaining setting bonded substrates in accordance with a first embodiment of the present invention.
Figure 10:
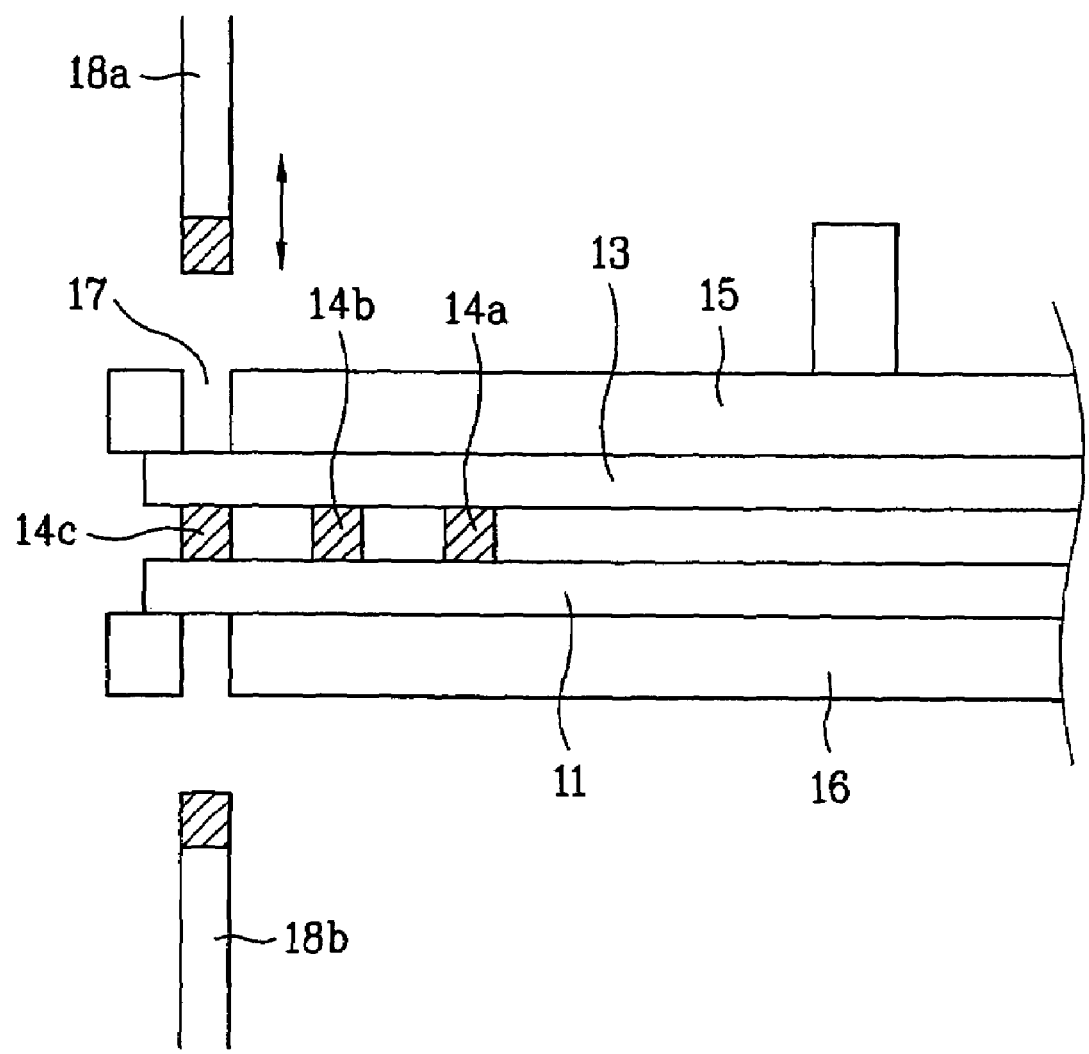
FIG. 10 illustrates a section of the upper/lower stages and substrates across the line I-I' in FIG. 4.

FIG. 4 illustrates a layout of seals on a substrate for explaining setting bonded substrates of the present invention. FIG. 10 illustrates a section of upper and lower stages and substrates across the line I-I' in FIG. 4.

In the method for setting bonded substrates in accordance with a first embodiment of the present invention, during coating of the sealant 14 by using photo (UV)-setting resin, thermosetting resin, photo (UV)-thermosetting resin, or pressure setting resin, as shown in FIG. 4, a plurality of main seals 14a are formed on a periphery of each panel both for bonding the two substrates and sealing the liquid crystal between the two substrates, a dummy seal 14b is formed to surround a plurality of panels for protecting the main seals 14a on an inner side thereof during bonding and pressing, and a plurality of setting seals 14c are formed on an outer periphery of the second substrate, i.e., an outer periphery of the dummy seal 14b at fixed intervals, on the second glass substrate 13. Since the dummy seal 14b is provided for protecting the main seals 14a, and the setting seals 14c are provided only for setting the two substrates, the dummy seal 14b and the setting seals 14c are removed during cutting.

Thus, after the setting seals 14c are formed and the two substrates are pressed and bonded, the bonded two substrates are set by directing the UV beam, or applying heat or a pressure to the setting seals 14c. That is, when the setting seals 14c are formed from the UV setting sealant, the UV beam is directed to the setting seals 14c, to set the substrates, and when the setting seals 14c are formed from the thermosetting or the pressure setting sealant, heat or pressure is selectively applied only to the setting seals 14c for setting the setting seals 14c.

Referring to FIG. 10, the upper stage 15 and/or the lower stage 16 have a plurality of holes 17 (around 14) for directing the UV beam or applying heat. Therefore, since the substrates are held at relevant stages after the substrates are aligned to respective stages before the substrates are bonded, it may be assumed that the setting seals 14c and the holes 17 are aligned. Accordingly, upon directing the UV beam, or applying heat or pressure to the setting seals 14c from an upper stage side or a lower stage side through the holes 17, the setting seals 14c are set, to set the two substrates. The UV beam direction to the setting seals 14c is made by a UV beam emitting pin 18a or 18b, which emits the UV beam, moved downward from an upper side of the bonding chamber or moved upward from a lower side of the bonding chamber in a condition of about 50-500 mW for about 5-40 seconds. For example, about 200 mW of an UV beam is directed for approximately 14 seconds. When it is intended to set the setting seals 14c by heat, a heating device 18a or 18b is moved downward from the upper side of the bonding chamber or moved upward from the lower side of the bonding chamber, the heating device 18a or 18b comes into contact with a part of the first or second substrates 11 or 13 the setting seals 14c are coated thereon through the holes 17, and heats the setting seals 14c. The heat is applied in a condition of about 50-200° C. for about 10 seconds for selective setting of the setting seals 14c only. The UV beam direction and the heat application may be carried out at the same time.

Of course, though the main seals 14a, the dummy seal 14b, and the setting seals 14c may be formed on the second glass substrate, the dummy seal 14b or the setting seals 14c may be formed on the first glass substrate 11 as the cases demand, and the setting seals 14c may be formed of a material different from the main seals 14a. Moreover, the main seals 14a may be formed on the first substrate 11 and the setting seals 14c may be formed on the second substrate 13, or all the seals may be formed on the first substrate 11 the liquid is to be dropped thereon.

Figure 5:
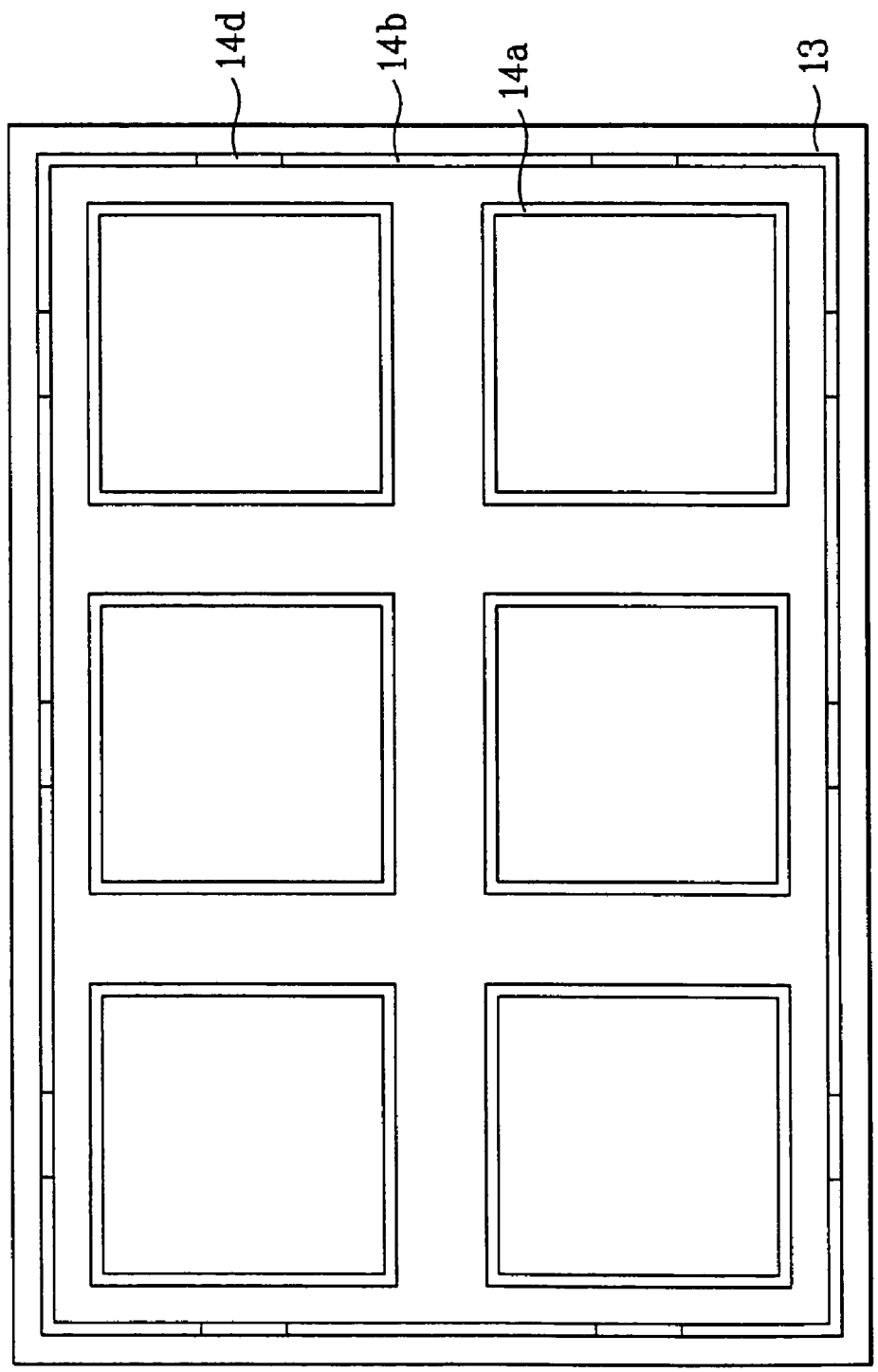
FIG. 5 illustrates a layout of seals for explaining setting in accordance with a second embodiment of the present invention.

FIG. 5 illustrates a layout of seals on a substrate for explaining setting in accordance with a second embodiment of the present invention.

Referring to FIG. 5, a method for setting bonded substrates in accordance with a second embodiment of the present invention includes coating the material described before (UV-setting resin, a thermosetting resin, a UV-thermosetting resin, a pressure setting resin, or the like) to form main seals 14a on a periphery of each of the panels for bonding the two substrates and sealing the liquid crystal between the two substrates, coating the material to form a dummy seal 14b to surround the plurality of panels for protecting the main seals 14a during bonding and pressing, and directing an UV beam, applying heat or pressure, to parts of the dummy seal 14b, for setting the two substrates.

That is, in the method for setting bonded substrates in accordance with a first embodiment of the present invention as shown in FIG. 4, the UV beam is directed to, or heat is applied to parts of the dummy seal 14b, to set the parts of the dummy seals 14b. The conditions of the UV beam direction and the heat application are the same as the first embodiment, and the UV beam direction and the heat application may be made at the same time. The unexplained symbol 14d in FIG. 5 denotes the parts the UV beam is directed thereto, or the heat is applied thereto.

Figure 6:
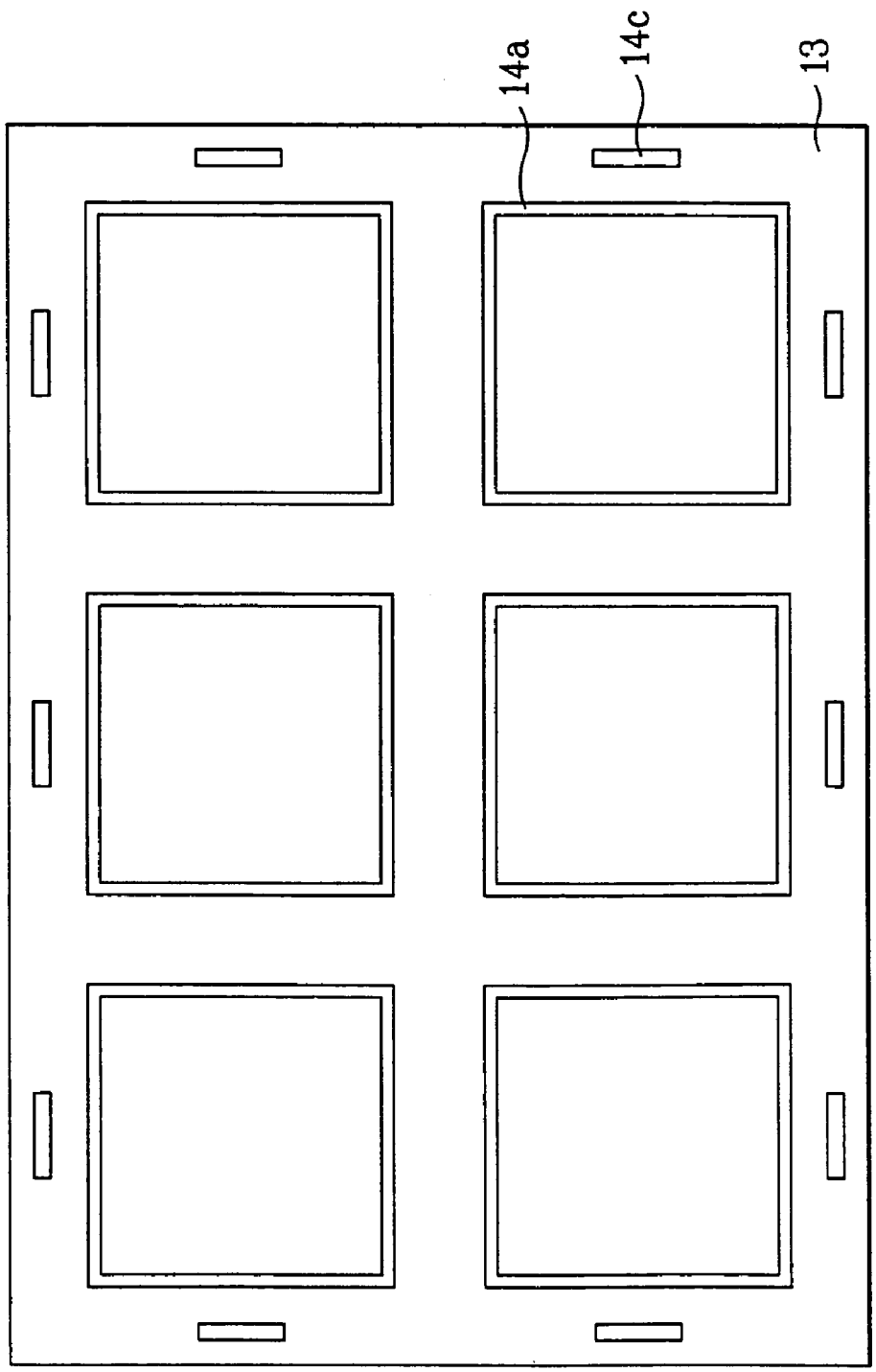
FIG. 6 illustrates a layout of seals for explaining setting in accordance with a third embodiment of the present invention.

FIG. 6 illustrates a layout of seals on a substrate for explaining setting in accordance with a third embodiment of the present invention.

Figure 9:
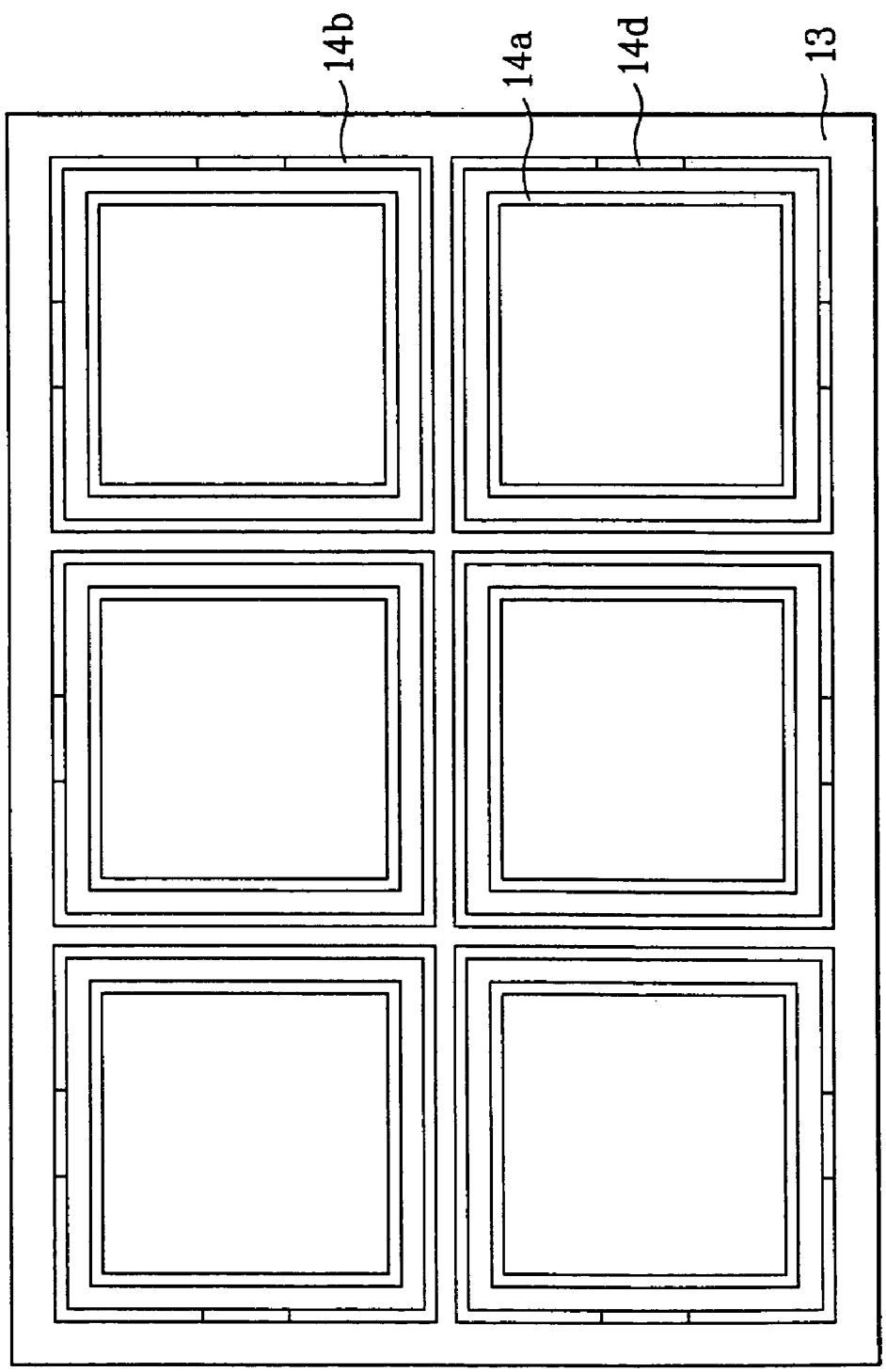
FIG. 9 illustrates a layout of seals for explaining setting in accordance with a sixth embodiment of the present invention.

Referring to FIG. 9, a method for setting bonded substrates in accordance with a third embodiment of the present invention sets the two bonded substrates, not by forming the dummy seal, but by forming the main seals 14a and the setting seals 14c on a periphery of the substrate, and directing a UV beam or applying heat or pressure to the setting seals 14c, in view of the method for setting bonded substrates in accordance with a first embodiment of the present invention. Other conditions are the same as the first embodiment. The setting seals 14c may have a form which is the same as the dummy seal described in the first or second embodiment.

Figure 7:
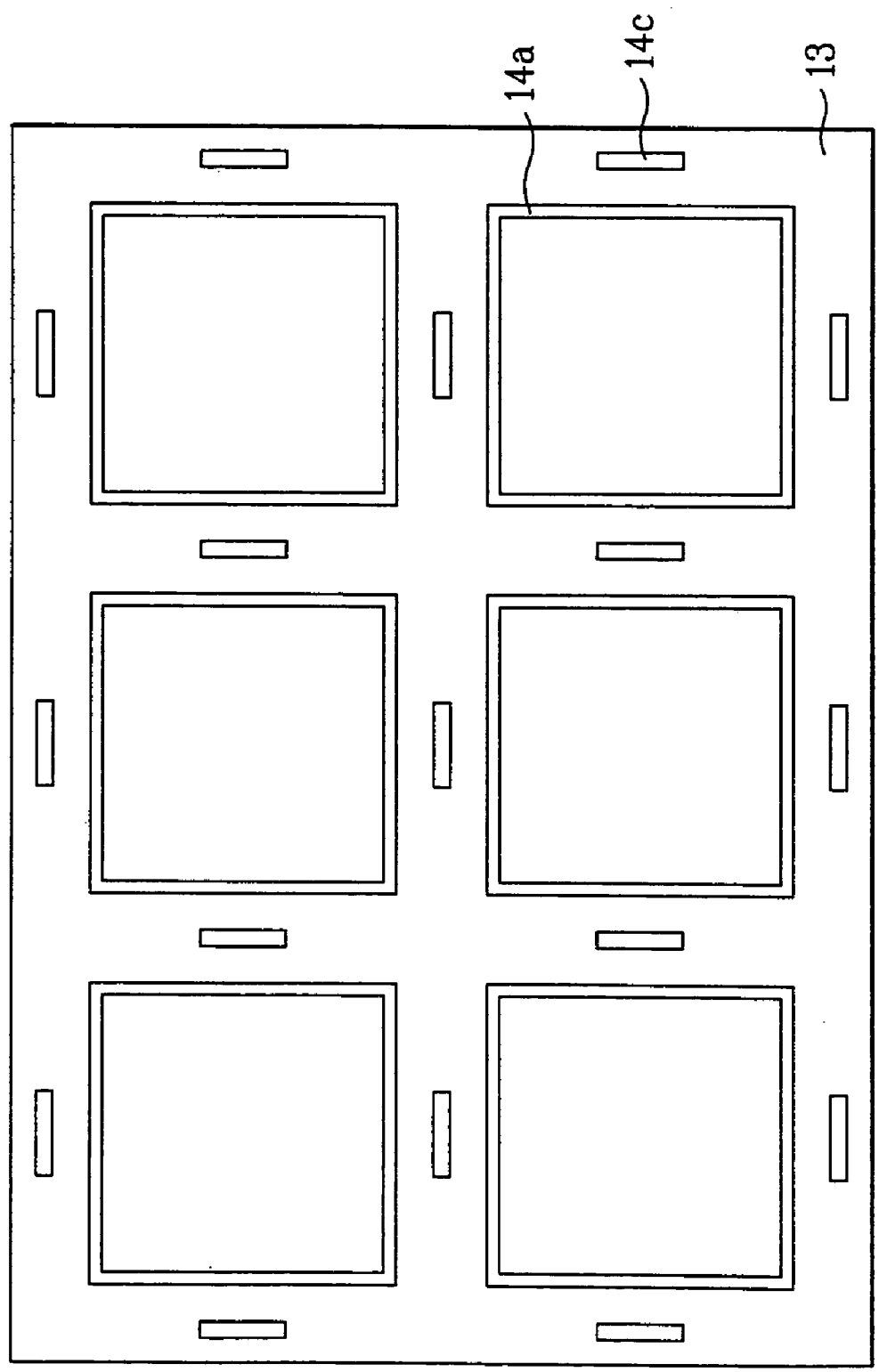
FIG. 7 illustrates a layout of seals for explaining setting in accordance with a fourth embodiment of the present invention.

FIG. 7 illustrates a layout of seals on a substrate for explaining setting in accordance with a fourth embodiment of the present invention.

Referring to FIG. 7, a method for setting bonded substrates in accordance with a fourth embodiment of the present invention sets the two bonded substrates by forming the setting seals 14c, not only on a periphery of the substrate, but also in cutting parts between panels at fixed intervals, and directing a UV beam or applying heat or pressure to the setting seals 14c, in view of the method for setting bonded substrates in accordance with the third embodiment of the present invention. Other conditions are the same as the first embodiment.

Figure 8:
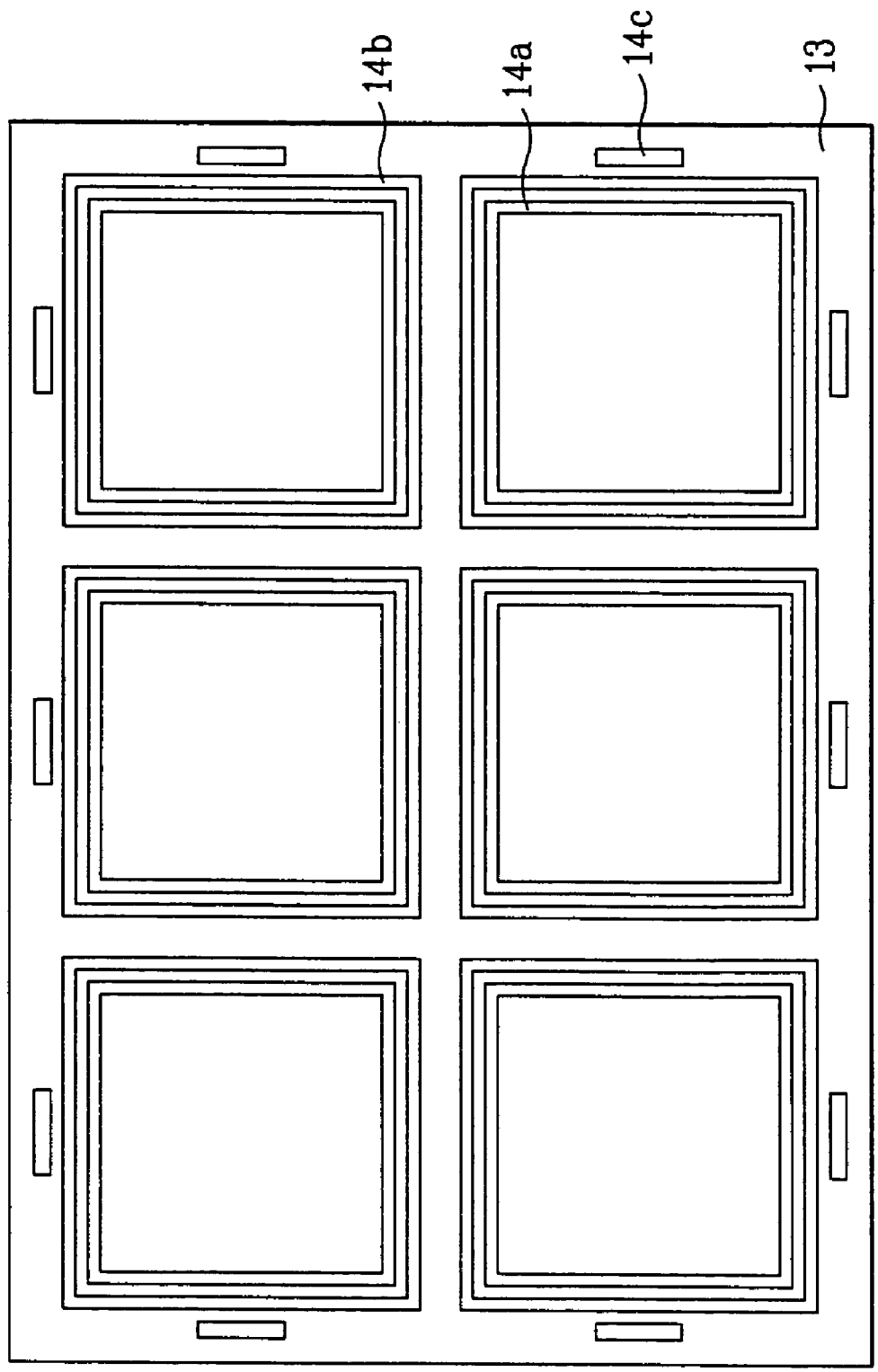
FIG. 8 illustrates a layout of seals for explaining setting in accordance with a fifth embodiment of the present invention.

FIG. 8 illustrates a layout of seals on a substrate for explaining setting in accordance with a fifth embodiment of the present invention.

Referring to FIG. 8, a method for setting bonded substrates in accordance with a fifth embodiment of the present invention sets the two bonded substrates, not by forming a dummy seal 14b to surround all the panels (main seals), but by forming a plurality of dummy seals to surround each of panels (main seals), and forming the setting seals 14c in a periphery of the substrate, and directing an UV beam or applying heat or pressure to the setting seals 14c, in view of the method for setting bonded substrates in accordance with a first embodiment of the present invention shown in FIG. 4. Other conditions are the same as the first embodiment.

FIG. 9 illustrates a layout of seals for explaining setting in accordance with a sixth embodiment of the present invention.

Referring to FIG. 9, a method for setting bonded substrates in accordance with a sixth embodiment of the present invention sets the two bonded substrates, not by forming the setting seals 14c separately, but by directing an UV beam or applying heat to parts of the plurality of dummy seals 14b formed on each panel, in view of the method for setting bonded substrates in accordance with a fifth embodiment of the present invention shown in FIG. 8. Other conditions are the same as the first embodiment.

Though not shown in the drawings, a method for setting bonded substrates in accordance with a seventh embodiment of the present invention sets the two bonded substrates, not by forming separate dummy seals or setting seals on the substrate, but by directing an UV beam, or applying heat to parts of main seals formed of an UV-setting resin, a thermosetting resin, or an UV and thermosetting resin, for bonding the two substrates, thereby setting the substrates.

Also, though not shown in the drawings, a method for setting bonded substrates in accordance with an eighth embodiment of the present invention sets the two bonded substrates, by applying an adhesive with a setting property superior to the setting sealant to parts the setting seals 14c are formed therein in the first, third, fourth, or fifth embodiment, and bonding the first and second glass substrates by the adhesive.

SECOND EXAMPLE

In the meantime, since it is likely that a uniform pressure application fails in the venting if the setting is carried out before the venting, the setting may be carried out after the venting. FIG. 11 illustrates a flow chart showing the steps of a bonding method in accordance with a second example of the present invention. In the bonding method in accordance with a second example of the present invention, the bonded substrates are set, not before the venting, but after the venting.

That is, like the first example of the present invention, a first substrate 11 having the liquid crystal 12 dropped thereon and a second substrate 13 having the sealant 14 coated thereon are provided (step 51S of FIG. 11), and the second glass substrate 13 having the sealant coated thereon is cleaned using an Ultra Sonic Cleaner (USC) (step 52S in FIG. 11).

The second substrate 13 is loaded on an upper stage 15 of a vacuum bonding chamber 10 with a surface of the second substrate 13 having the sealant 14 coated thereon faced downward (step 53S in FIG. 11), and the first glass substrate 11 having the liquid crystal 12 dropped thereon is loaded on a lower stage 16 of the vacuum bonding chamber 10 (step 54S in FIG. 11).

The upper stage is moved downward, to pre-align the first substrate 11 and the second substrate 13, and a glass receiver (not shown) of the bonding machine is brought to an underside of the second glass substrate 13 held at the upper stage 15 (step 55S in FIG. 11).

The bonding chamber 10 is evacuated (step 56S in FIG. 11) until the vacuum bonding chamber 10 reaches a certain vacuum state, when the upper and lower stages 15 and 16 hold the first and second substrates 11 and 13 respectively, by electro static charge (ESC) (step 57S in FIG. 11), then, the glass substrate is returned to an original position (step 58S in FIG. 11).

The upper stage 15 is moved downward to press the first glass substrate 11 and the second glass substrate 13 (a first pressure application) (step 59S in FIG. 11), the upper stage 15 is moved upward, to separate the upper stage 15 from the two glass substrates 11 and 13 after electro static charge (ESC) is off, and the bonded substrates are held at the lower stage 16 by means of an N-chuck (not shown).

For changing the bonding chamber from a vacuum state to an atmospheric state, and applying a pressure to the bonded substrates uniformly, a gas, such as N2, or clean dry air is supplied to the bonding chamber 10, for venting the vacuum bonding chamber (step 60S in FIG. 11).

The pressed substrates are set (step 61S in FIG. 11). As explained in the first example of the present invention, after the upper stage 15 is moved downward close to the pressed substrates, the UV beam may be directed to, or partly applying heat or pressure to, the setting seals, for setting the first and second substrates 11 and 13. In this instance, the setting is carried out for preventing the bonded two substrates from being misaligned, to maintain a bonded state during carrying out a subsequent process, or movement after bonding, because it is likely that misalignment of the bonded substrates occurs as the two substrates are deformed during progressing to a subsequent process, or movement after the bonding as the substrate becomes large (1000×1200 mm) and the two substrates are bonded after the liquid crystal is dropped.

Then, the set substrates are unloaded (step 62S in FIG. 11).

Bonding conditions of the second example of the present invention are the same as the bonding conditions of the first example of the present invention.

As has been explained, the method for fabricating an LCD of the present invention has the following advantages.

First, the dropping of the liquid crystal on the first substrate and the coating of the sealant on the second substrate shorten a fabrication time period up to the step where the two substrates are bonded.

Second, the dropping of the liquid crystal on the first substrate and the coating of the sealant on the second substrate, which permits a balanced progression of the fabrication processes of the first and second substrates, permits an effective operation of a production line.

Third, the positioning of the substrate receiver under the substrate before the evacuation of the vacuum bonding chamber prevents the substrate held at the upper stage vacuum from falling down and being broken.

Fourth, the sensing of a time the two substrates come into contact and the varying of the pressure in bonding the two substrates minimizes damage that the liquid crystal may cause to the orientation film.

Fifth, since the upper stage presses down the substrate by means of a plurality of shafts each of which can apply pressure independently, uniform bonding of the sealant can be made by applying a relatively lower or higher pressure at a pertinent shaft when the lower stage and the upper stage are not leveled and fail to bond the sealant uniformly.

Sixth, the two-stage evacuation of the vacuum bonding chamber prevents the deformation of the substrate and air flow in the chamber caused by sudden vacuum.

Seventh, the venting of the bonding chamber from a vacuum state to an atmospheric state in order to apply a pressure to the bonded substrates uniformly, improves a productivity of the LCD.

Eighth, the simultaneous loading and unloading shortens a fabrication time period.

Ninth, the conducting of the liquid crystal spreading process shortens a fabrication time period of the LCD.

Tenth, the dropping of the liquid crystal on the first substrate and coating the sealant on the second substrate, which permits cleaning of the substrate having the sealant coated thereon by the ultra sonic cleaner (USC) prior to bonding, permits the sealant from being contaminated with particles.

Eleventh, in the first example, venting after setting parts of the dummy seals or the main seals, or fixing the bonded substrates by using separate adhesive, after bonding, prevents the first and second glass substrates from being misaligned.

Twelfth, in the second example, venting without setting the substrates to apply a pressure, permits more uniform pressure application.

It will be apparent to those skilled in the art that various modifications and variations can be made in the method for fabricating an LCD of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD), comprising:
   providing a first substrate and a second substrate, wherein a sealant is disposed on one of the first and second substrates;
   loading the first and second substrates into a bonding chamber;
   bonding the first and second substrates together via the sealant, wherein a gap defined between the first and second substrates is maintained at a first pressure;
   after the bonding, injecting gas into the bonding chamber to maintain a pressure within the bonding chamber at a second pressure, wherein the second pressure is greater than the first pressure;
   after the injecting, setting the bonded first and second substrates; and
   unloading the set first and second substrates from the bonding chamber.

2. The method as claimed in claim 1, wherein the gas injected into the bonding chamber is nitrogen or clean dry air.

3. The method as claimed in claim 1, wherein the injecting includes injecting gas through tubes formed in the bonding chamber.

4. The method as claimed in claim 1, wherein the injecting includes injecting gas from below the bonding chamber.

5. The method as claimed in claim 1, wherein the injecting includes injecting gas from above the bonding chamber.

6. The method as claimed in claim 1, wherein the injecting includes injecting gas from sides of the bonding chamber.

7. The method as claimed in claim 1, wherein the injecting includes:
   in a first injection step, injecting gas into the bonding chamber at a first rate; and
   in a second injection step, injecting gas into the bonding chamber at a second rate, wherein the second rate is different from the first rate.

8. The method as claimed in claim 7, wherein the second rate is greater than the first rate.

9. The method as claimed in claim 1, wherein the first pressure is about $1.0 \times 10^{-3}$ to about $1.0 \times 10^2$ Pa.

10. The method as claimed in claim 1, wherein the second pressure is atmospheric pressure.

11. The method as claimed in claim 1, wherein the second pressure is between about 0.4-3.0 kg/cm$^2$.

12. The method as claimed in claim 1, wherein the bonding comprises:
holding the first substrate at a lower stage of the bonding chamber;
holding the second substrate at an upper stage of the bonding chamber;
evacuating the bonding chamber to the first pressure; and
forming the gap by decreasing a distance between the lower and upper stages until the sealant contacts the first and second substrates.

13. The method as claimed in claim 12, further including forming the gap to a height of about 25-35 μm between the first and second substrates.

14. The method as claimed in claim 12, wherein the injecting includes injecting gas through the upper stage.

15. The method as claimed in claim 12, further comprising raising the upper stage with respect to the bonded first and second substrates.

16. The method as claimed in claim 15, wherein the injecting begins after raising the upper stage.

17. The method as claimed in claim 15, wherein the injecting begins before the upper stage is completely raised.

18. The method as claimed in claim 15, wherein the injecting occurs during the raising of the upper stage.

19. The method as claimed in claim 15, wherein the injecting begins when the raising begins.

20. The method as claimed in claim 15, wherein the raising begins after the injecting begins.

21. The method as claimed in claim 15, wherein the raising begins after the injecting is complete.

22. The method as claimed in claim 1, wherein a height of the gap is less than about 5 μm after injecting the gas.

23. The method as claimed in claim 1, wherein the setting is performed before the unloading.

24. The method as claimed in claim 1, wherein the setting includes setting a portion of the sealant.

25. A method for fabricating liquid crystal display devices, comprising:
within a bonding chamber maintained at a first pressure, bonding a first substrate to a second substrate via a sealant interposed between the first and second substrates;
increasing the pressure within the bonding chamber containing the bonded first and second substrates from the first pressure to a second pressure;
after increasing the pressure, setting a portion of the sealant; and
after the setting, unloading the bonded first and second substrates from the bonding chamber.

26. The method as claimed in claim 25, wherein increasing the pressure includes:
in a first injection step, injecting gas into the bonding chamber at a first rate; and
in a second injection step, injecting gas into the bonding chamber at a second rate, wherein the second rate is different from the first rate.

27. The method as claimed in claim 26, wherein the second rate is greater than the first rate.

28. The method as claimed in claim 25, wherein the bonding comprises:
holding the first substrate at a lower stage of the bonding chamber;
holding the second substrate at an upper stage of the bonding chamber; and
reducing the pressure within the bonding chamber to the first pressure.

29. The method as claimed in claim 28, wherein increasing the pressure includes injecting gas through the upper stage.

30. The method as claimed in claim 28, wherein reducing the pressure within the bonding chamber to the first pressure includes evacuating the bonding chamber in a single stage.

31. The method as claimed in claim 28, wherein reducing the pressure within the bonding chamber to the first pressure includes evacuating the bonding chamber in more than one stage.

32. The method as claimed in claim 28, wherein the bonding further includes aligning the first and second substrates with respect to each other.

33. The method as claimed in claim 28, wherein the bonding further includes aligning the first and second substrates with respect to each other.

34. The method as claimed in claim 25, wherein the sealant includes at least one main sealant surrounding a panel area of the first and second substrates.

35. The method as claimed in claim 34, wherein the sealant further includes at least one dummy sealant at a periphery of the first and second substrates.

36. The method as claimed in claim 35, wherein the setting includes setting a portion of the dummy sealant.

37. The method as claimed in claim 35, wherein the sealant further includes at least one setting sealant between the periphery of the first and second substrates and the dummy sealant, wherein the setting includes setting the at least one setting sealant.

38. The method as claimed in claim 34, wherein the sealant further includes at least one dummy sealant at a periphery of the at least one main sealant.

39. The method as claimed in claim 38, wherein the setting includes setting a portion of the dummy sealant.

40. The method as claimed in claim 38, wherein the sealant further includes at least one setting sealant between the periphery of the first and second substrates and the dummy sealant, wherein the setting includes setting the at least one setting sealant.

41. The method as claimed in claim 34, wherein the sealant further includes at least one setting sealant at a periphery of the first and second substrates, wherein the setting includes setting the at least one setting sealant.

42. The method as claimed in claim 41, wherein the at least one sealant further includes at least one setting sealant between adjacent ones of main sealant.

43. A method of manufacturing a liquid crystal display (LCD) device, comprising:
preparing a first substrate and a second substrate;
forming a sealant on one of the first and second substrates;
applying liquid crystal on the one of the first or second substrates on which the sealant is disposed;
loading the first and second substrates into a bonding chamber;
bonding the first and second substrates together via the sealant, wherein a gap of a predetermined height defined between the first and second substrates is maintained using a first pressure, wherein a combined thickness of the bonded first and second substrates is substantially uniform, and wherein the area between the first and second substrate is free of moisture;
after the bonding, injecting dry gas into the bonding chamber to maintain a pressure within the bonding chamber at a second pressure, wherein the second pressure is greater than the first pressure;
after the injecting, setting the bonded first and second substrates; and
unloading the set first and second substrates from the bonding chamber.

* * * * *